(12) United States Patent
Sasaki

(10) Patent No.: US 6,578,252 B2
(45) Date of Patent: Jun. 17, 2003

(54) METHOD OF MANUFACTURING A THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 106 days.

(21) Appl. No.: 09/749,579

(22) Filed: Dec. 28, 2000

(65) Prior Publication Data

US 2001/0040763 A1 Nov. 15, 2001

(30) Foreign Application Priority Data

Jan. 7, 2000 (JP) ........................................ 2000-005904

(51) Int. Cl.[7] .............................. G11B 5/187; B44C 1/22
(52) U.S. Cl. ................................ 29/603.12; 29/603.11; 29/603.13; 29/603.16; 29/603.23; 360/122; 360/123; 360/126; 216/22; 216/38; 216/52
(58) Field of Search ..................... 29/603.12, 603.11, 29/603.07, 603.13, 603.16, 603.23, 603.24; 216/22, 38, 52; 360/126, 122, 123, 317, 320; 451/5

(56) References Cited

U.S. PATENT DOCUMENTS 4,966,648 A * 10/1990 Nakamura et al. ............ 216/22
5,966,800 A * 10/1999 Huai et al. ................ 29/603.13

FOREIGN PATENT DOCUMENTS

JP 56-156915 * 12/1981 ............... 216/22 X

* cited by examiner

Primary Examiner—A. Dexter Tugbang
(74) Attorney, Agent, or Firm—Oliff & Berridge, PLC

(57) ABSTRACT

A method of manufacturing a thin film magnetic head allowing high performance head characteristics to be achieved without complicating manufacturing steps. At the same time an insulating film pattern defining a throat height TH is formed, an insulating film pattern is formed. When a thin film coil is formed, a coil connection portion integral with the thin film coil is simultaneously formed on the insulating film pattern, so that an upper surface of the coil connection portion is positioned higher than that of thin film coil. After covering the entire surface with an insulating film, a surface of the insulating film is polished until both of an upper connection portion and the coil connection portion are exposed, so that only the coil connection portion can be exposed while the thin film coil remains unexposed.

5 Claims, 21 Drawing Sheets

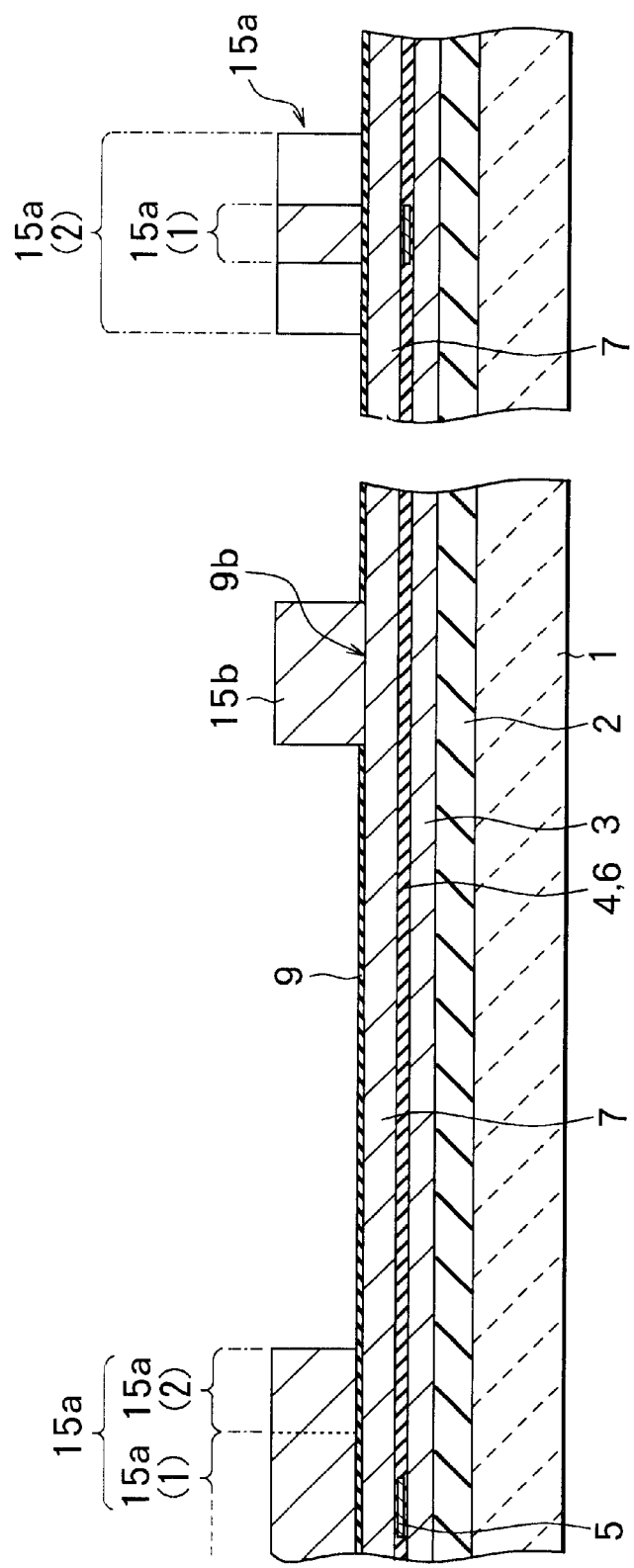

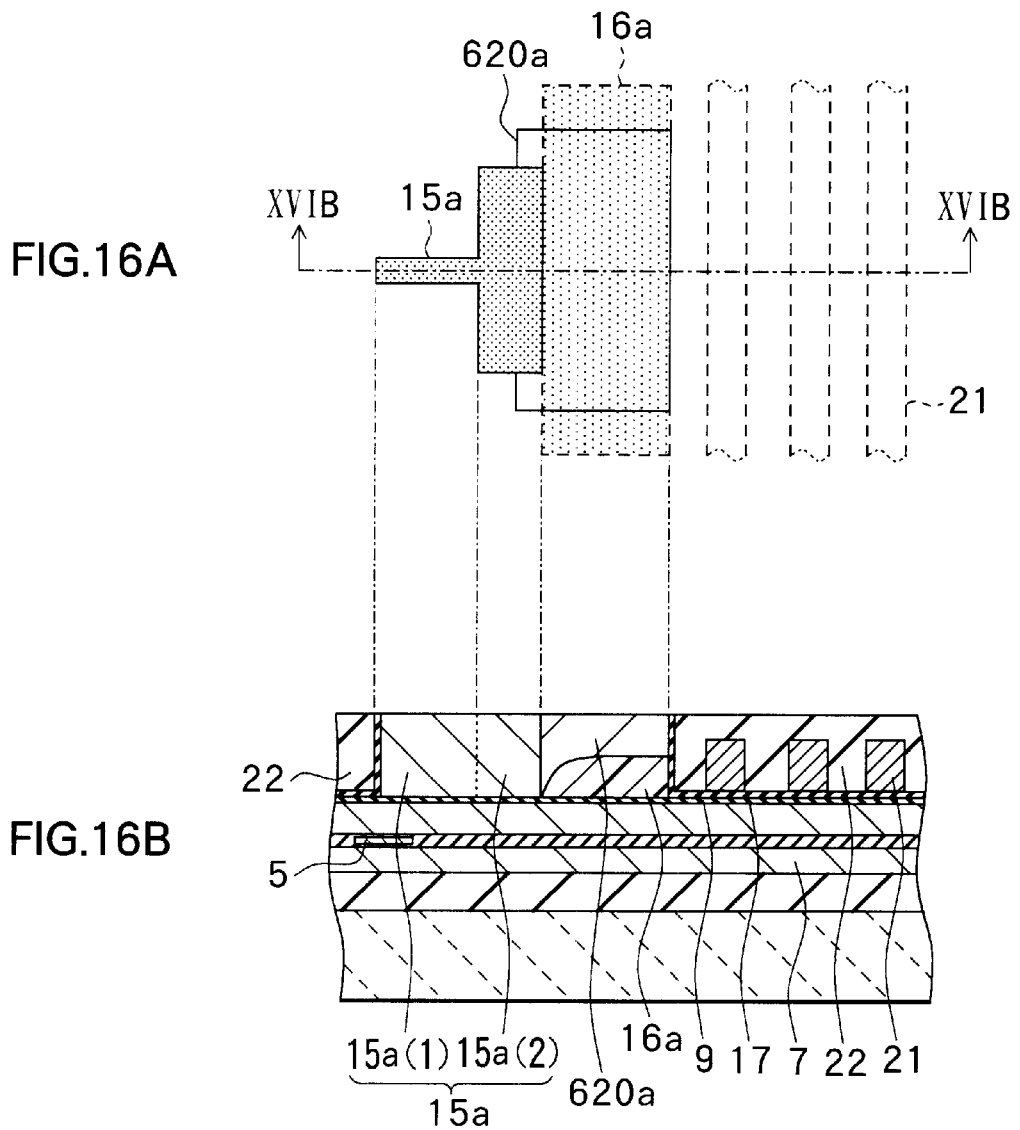

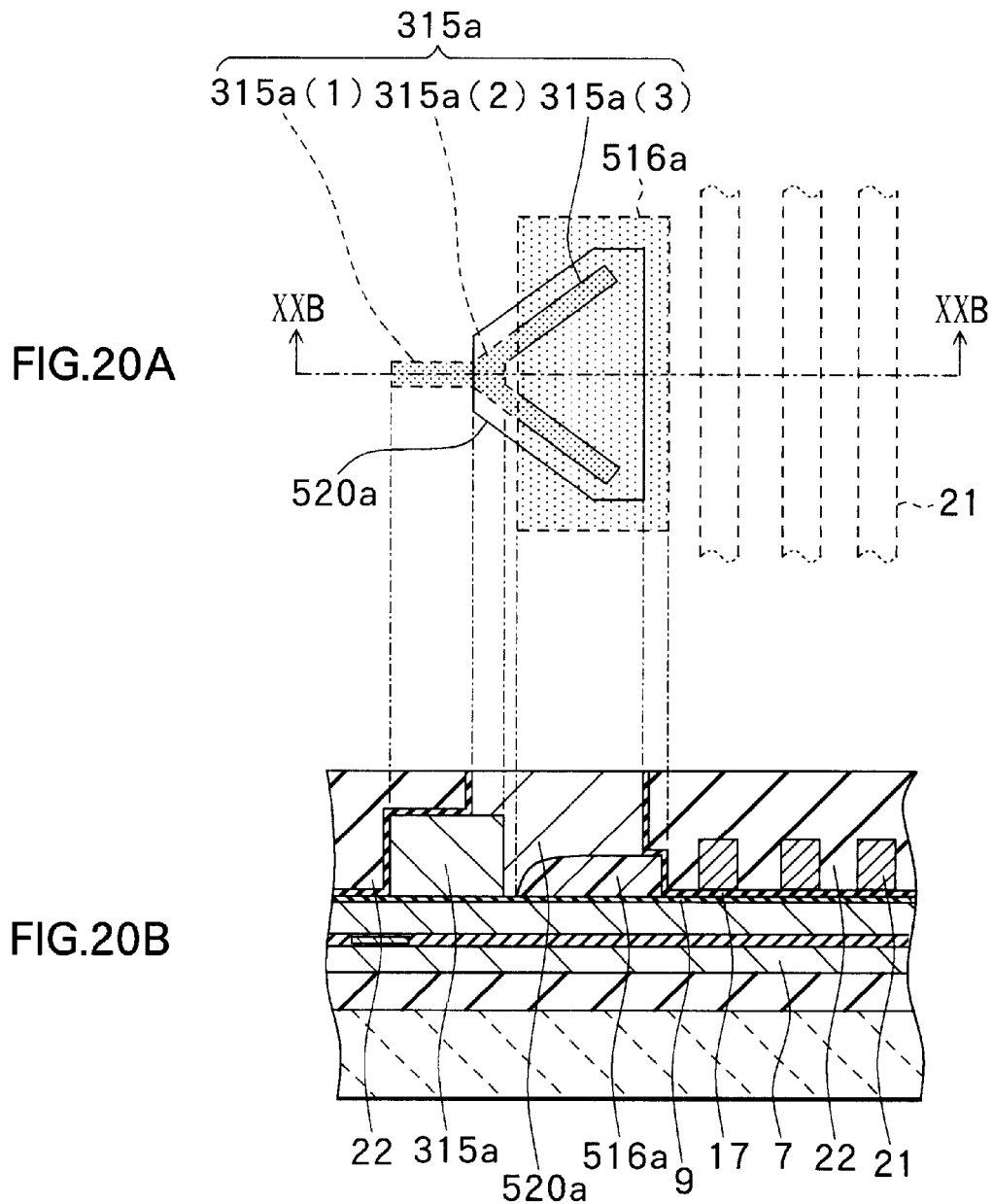

METHOD OF MANUFACTURING A THIN FILM MAGNETIC HEAD

BACKGROUND OF THE INVENTION

1. Field of the Invention

The present invention relates to a thin film magnetic head having at least an inductive-type magnetic transducer for writing and a method of manufacturing the same.

2. Description of the Related Art

Improvements in the performance of a thin film magnetic head is sought since a surface recording density of a hard disk device has been improved. A composite thin film magnetic head having a structure, in which a recording head having an inductive-type magnetic transducer for writing and a reproducing head having a magneto resistive (hereinafter referred to as MR) element for reading are stacked, is widely used as the thin film magnetic head. The MR element includes an anisotropic magneto resistive (hereinafter referred to as AMR) element using an AMR effect and a giant magneto resistive (hereinafter referred to as GMR) element using a GMR effect. The reproducing head using the AMR element is called an AMR head or simply an MR head, and the reproducing head using the GMR element is called a GMR head. The AMR head is used as a reproducing head whose surface recording density is over 1 gigabit per square inch, and the GMR head is used as the reproducing head whose surface recording density is over 3 gigabit per square inch.

The AMR head has an AMR film having the AMR effect. The GMR head has a structure identical to the AMR head except that a GMR film having the GMR effect is used in place of the AMR film. However, when the same external magnetic field is applied, the GMR film exhibits greater change in resistance than the AMR film. As a result, the GMR head can increase the reproduction output three to five times the AMR head.

A method in which the AMR film being used as the MR film is exchanged with a material with better magneto resistive reaction such as the GMR film, and a method in which a pattern width of the MR film, especially the MR height, is made appropriate are used as the methods of improving the performance of the reproducing head. The MR height is a distance (height) between an edge of the MR element on the air bearing surface side to an edge thereof on the other side, and it is controlled by an etching amount of the air bearing surface. The air bearing surface, here, is a surface of the thin film magnetic head facing a magnetic recording medium, and is called a track surface as well.

On the other hand, performance improvements in a recording head have been desired while performance in a reproducing head has improved. A factor that determines the performance of the recording head is a throat height (TH). The throat height is a length (height) of a pole between the air bearing surface and an edge of an insulating film which electrically isolates a thin film coil for generating magnetic flux. A reduction in the throat height is desired in order to improve the recording head performance. The throat height is also controlled by an etching amount of the air bearing surface.

To improve a recording density among a variety of factors that influence the performance of the recording head, a track density of the magnetic recording medium must be increased. In order to achieve such an increase, a recording head with a narrow track structure must be realized in which widths of the top and bottom poles on the air bearing surface, which are formed on top and bottom sandwiching a write gap, are reduced from some microns to sub-microns. Semiconductor process techniques are employed to achieve the narrow track structure.

A composite thin film magnetic head having the above-described recording head and reproducing head is formed through a plurality of manufacturing steps, such as sputtering, photolithography, electrolytic plating, etching, polishing, and the like.

A problem associated with a series of steps of manufacturing a thin film magnetic head including a variety of steps as mentioned above is a long lead-time required to manufacture the head. Therefore, specific improvement measures, such as reduction in number of manufacturing steps, are desired for achieving a decrease in lead-time for mass production.

SUMMARY OF THE INVENTION

The present invention has been conceived in view of the above-described problems, and an object thereof is to provide a thin film magnetic head and a method of manufacturing the same that enable achievement of high-performance head characteristics without complicating the manufacturing steps.

The present invention provides a method of manufacturing a thin film magnetic head including two magnetic layers magnetically coupled to each other and having two magnetic poles which face each other with a gap layer in between and are to be faced with a recording medium, a thin film coil provided between the two magnetic layers with an insulating layer disposed in between, one of the two magnetic layers including a first magnetic layer portion which extends from a recording-medium-facing surface facing the recording medium in a direction away from the recording-medium-facing surface and has a constant width portion defining a track width, and a second magnetic layer portion covering an area where the thin film coil is disposed and partially overlapping, and magnetically coupled to, the first magnetic layer portion. The method includes a first step of forming a first insulating layer portion constituting part of the insulating layer and defining an edge of the insulating layer closest to the recording-medium-facing surface, and simultaneously forming a second insulating layer portion constituting part of the insulating layer in a region located farther from the recording-medium-facing surface than a region where the first insulating layer portion is disposed; a second step of forming the first magnetic layer portion; a third step of forming a first thin film coil pattern constituting part of the thin film coil, and simultaneously forming a connection pattern integrally with the first thin film coil pattern on the second insulating layer portion; a fourth step of forming a third insulating layer portion constituting part of the insulating layer so as to cover at least the first magnetic layer portion, the first thin film coil pattern, the second insulating layer portion, and the connection pattern; a fifth step of polishing and planarizing a surface of the third insulating layer portion until at least both of the first magnetic layer portion and the connection pattern are exposed; and a sixth step of forming a conductive layer pattern to be electrically connected to the exposed portion of the connection pattern.

In the method of manufacturing a thin film magnetic head of the invention, the connection pattern formed integrally with the first thin film coil pattern is disposed on the second insulating layer portion formed by the same step as the step of forming the first insulating layer portion. As a result, an upper surface of the connection pattern is positioned higher than that of the first thin film coil pattern. Therefore, when, after burying the first thin film coil pattern and the connection pattern with the third insulating layer portion, a surface of the third insulating layer portion is polished until the first magnetic layer portion and the connection pattern are both exposed, only the connection pattern is exposed while the first thin film coil pattern remains unexposed. As the second insulating layer portion is formed by the same step as the step of forming the first insulating layer portion, no additional steps are required for forming the second insulating layer portion.

The present invention provides a thin film magnetic head including two magnetic layers magnetically coupled to each other and having two magnetic poles which face each other with a gap layer in between and are to be faced with a recording medium, a thin film coil provided between the two magnetic layers with an insulating layer disposed in between, one of the two magnetic layers including a first magnetic layer portion which extends from a recording-medium-facing surface facing the recording medium in a direction away from the recording-medium-facing surface and has a constant width portion defining a track width, and a second magnetic layer portion covering an area where the thin film coil is disposed and partially overlapping, and magnetically coupled to, the first magnetic layer portion. The insulating layer includes a first insulating layer portion defining an edge of the insulating layer located closest to the recording-medium-facing surface, a second insulating layer portion disposed in a region farther from the recording-medium-facing surface than a region where the first insulating layer portion is disposed, and a third insulating layer portion filled up to a surface flush with an top surface of the first magnetic layer portion. The thin film coil includes a first thin film coil pattern, and a connection pattern disposed on the second insulating layer portion and formed integrally with the first thin film coil pattern. Part of a predetermined conductive layer pattern is disposed on the connection pattern.

In the thin film magnetic head or the method of manufacturing the same of the invention, the conductive layer pattern may be a wiring pattern for supplying electricity to the first thin film coil pattern. In such a case, the conductive pattern is preferably formed of the same material by the same step as the second magnetic layer portion.

Further, in the thin film magnetic head or the method of manufacturing the same of the invention, when the thin film coil further includes a second thin film coil pattern, the conductive layer pattern may be provided as the second thin film coil pattern. In such a case, a fourth insulating layer portion constituting part of the insulating layer may be provided to bury the conductive layer pattern.

Other and further objects, features and advantages of the invention will appear more fully from the following description.

BRIEF DESCRIPTION OF THE DRAWINGS

FIG. 1A and FIG. 1B are cross sectional views for describing a step in a method of manufacturing a thin film magnetic head according to a first embodiment of the invention.

FIG. 16A and FIG. 16B are a plan view and a cross sectional view, respectively, illustrating a step subsequent to the step shown in FIG. 15A and FIG. 15B.

FIG. 20A and FIG. 20B are a plan view and a cross sectional view, respectively, illustrating a method of manufacturing a thin film magnetic head according to a further variation of the first embodiment of the invention.

DETAILED DESCRIPTION OF THE PREFERRED EMBODIMENTS

Preferred embodiments of the invention will now be described in detail with reference to the accompanying drawings.

First Embodiment

Method of Manufacturing Thin Film Magnetic Head According to First Embodiment A method of manufacturing a thin film magnetic head according to a first embodiment of the invention will be described with reference to FIG. 1A to FIG. 12. In this embodiment, a composite thin film magnetic head provided with both a recording head and a reproducing head is described as an example. The thin film magnetic head of this embodiment will be described together with the method of manufacturing a thin film magnetic head of this embodiment because it is embodied by this method.

Figures 2A, 2B:
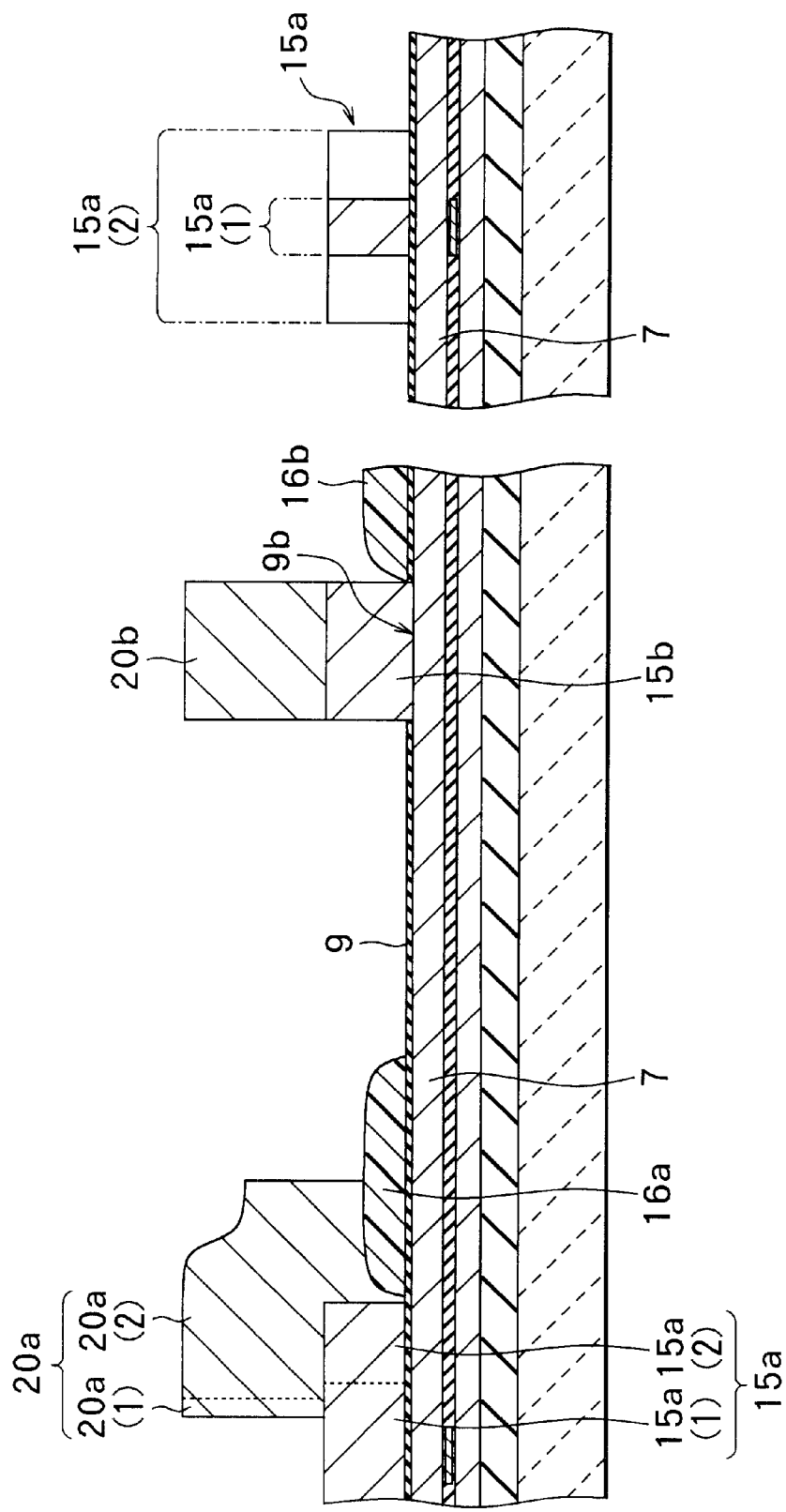
FIG. 2A and FIG. 2B are cross sectional views for describing a step subsequent to the step shown in FIG. 1A and FIG. 1B.
Figures 4A, 4B:
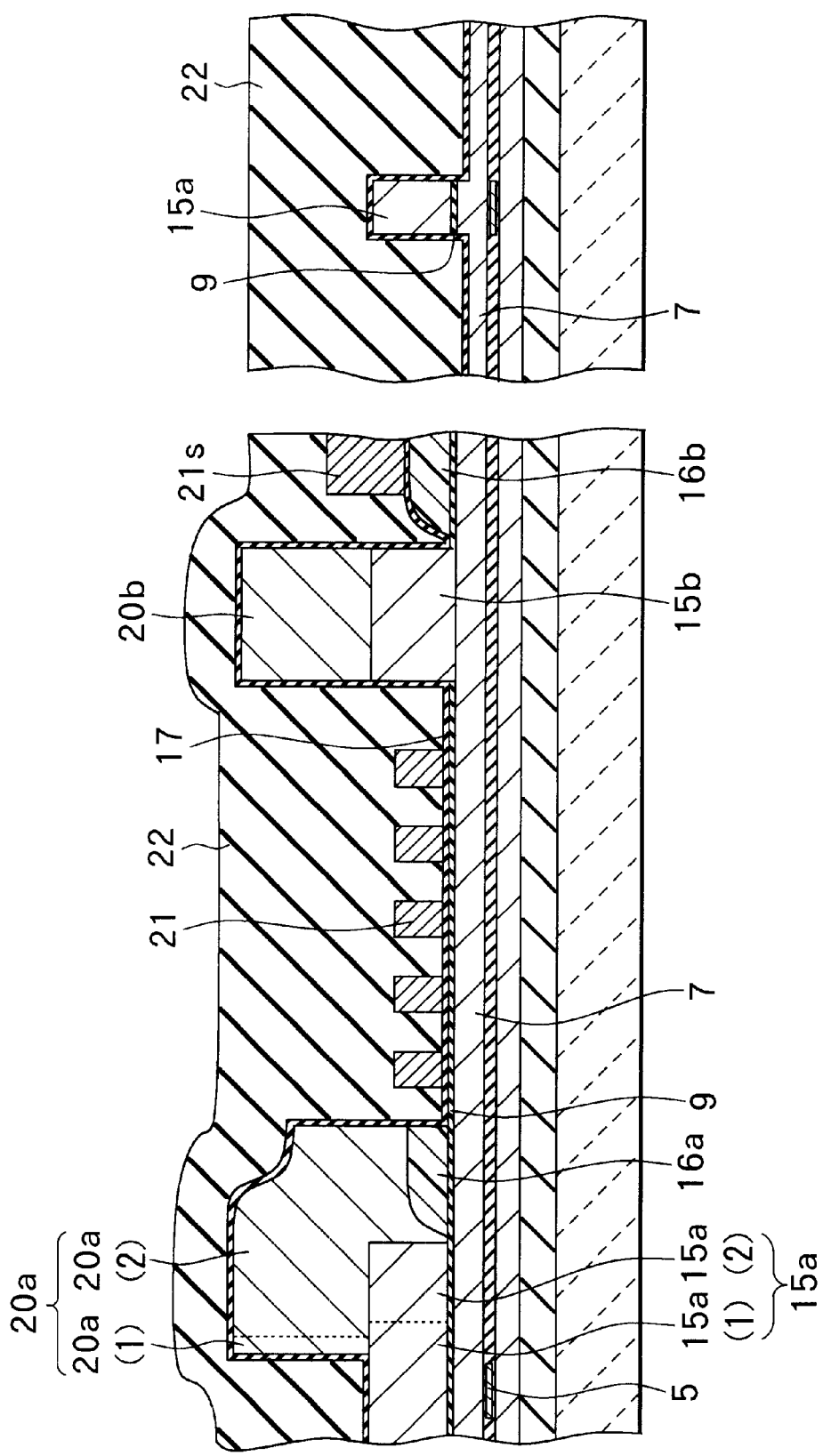
FIG. 4A and FIG. 4B are cross sectional views for describing a step subsequent to the step shown in FIG. 3A and FIG. 3B.
Figures 5A, 5B:
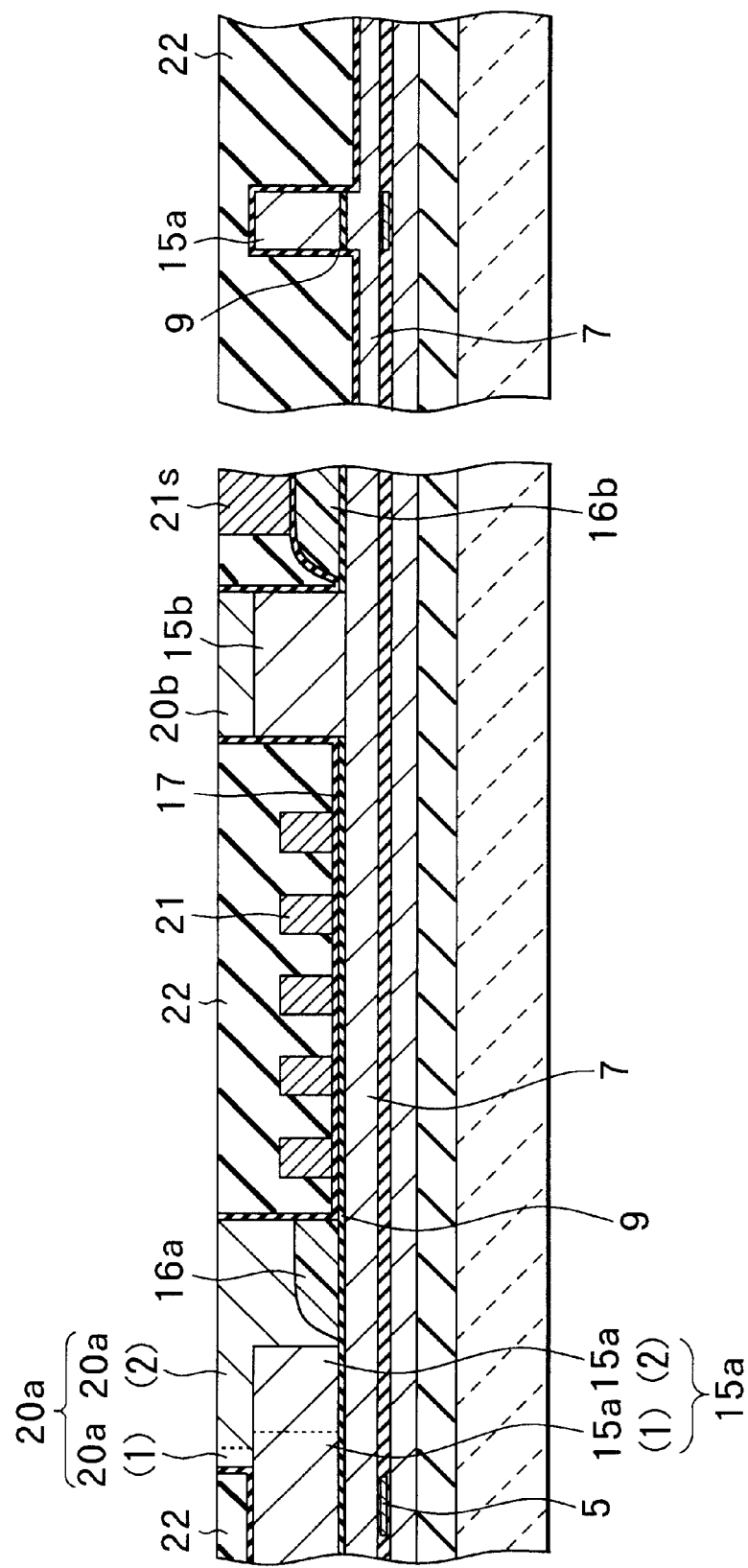
FIG. 5A and FIG. 5B are cross sectional views for describing a step subsequent to the step shown in FIG. 4A and FIG. 4B.
Figures 6A, 6B:
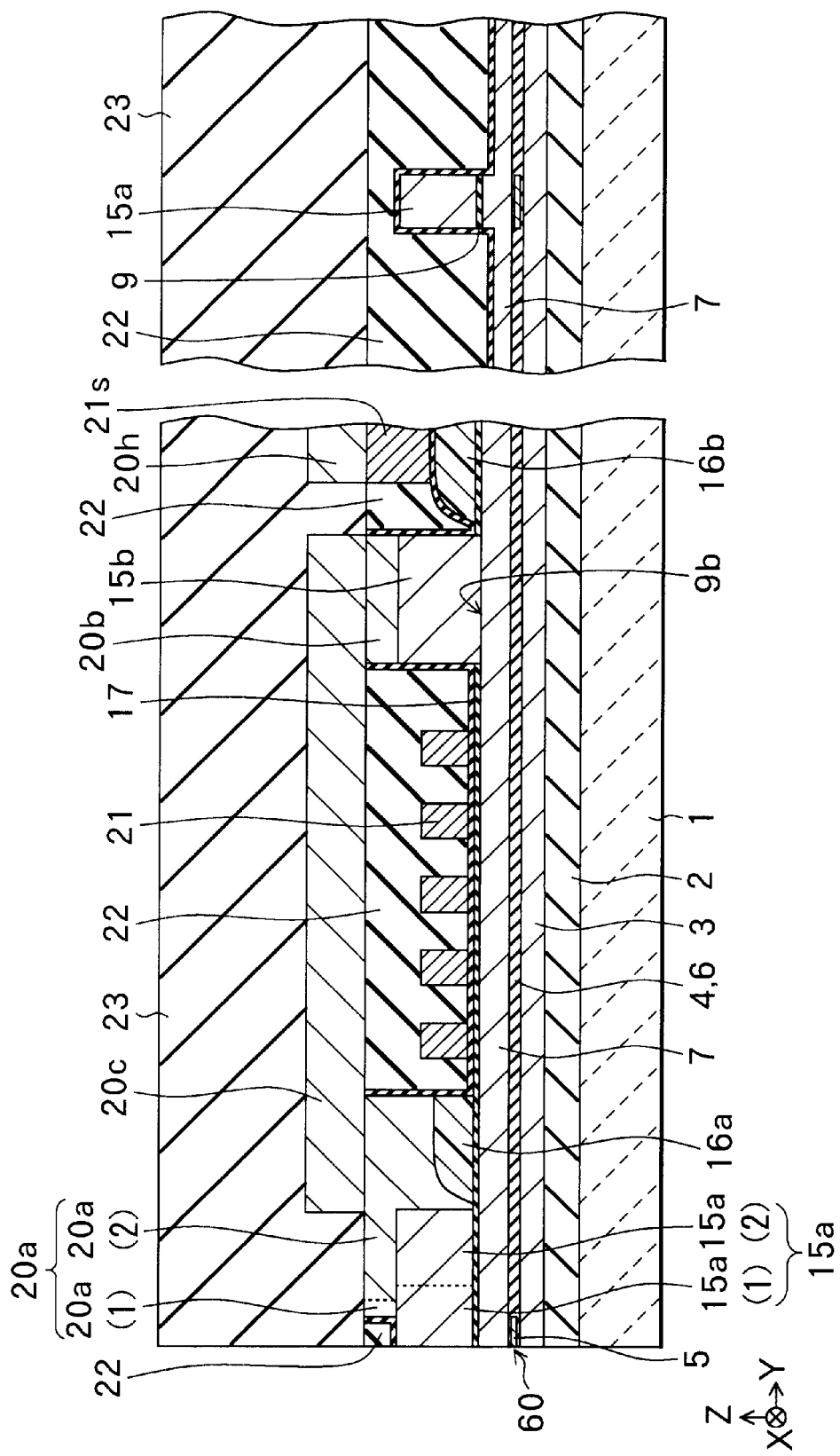
FIG. 6A and FIG. 6B are cross sectional views for describing a step subsequent to the step shown in FIG. 5A and FIG. 5B.

FIG. 1A, FIG. 2A, FIG. 3A, FIG. 4A, FIG. 5A, and FIG. 6A each illustrate a cross section perpendicular to an air bearing surface, while each of FIG. 1B, FIG. 2B, FIG. 3B, FIG. 4B, FIG. 5B, and FIG. 6B illustrates a cross section of a pole portion in parallel to the air bearing surface. FIG. 7 to FIG. 11 are perspective views corresponding to major manufacturing steps. More specifically, FIG. 7, FIG. 9, FIG. 10, and FIG. 11 correspond to the states shown in FIG. 1A and FIG. 1B, FIG. 2A and FIG. 2B, FIG. 3A and FIG. 3B, and FIG. 6A and FIG. 6B, respectively. It should be noted, however, that an insulating film 17 shown in FIG. 2A and FIG. 2B is not illustrated in FIG. 9 and that a thin film coil 21, an insulating film 22, and an overcoat layer 23 shown in FIG. 6A and FIG. 6B are not illustrated in FIG. 11.

In the following description, the distance in a direction parallel to the air bearing surface, which is a horizontal direction in, for example, FIG. 1B, will be referred to as a "width", and the distance in a direction perpendicular to the air bearing surface (a horizontal direction in FIG. 1A, for example) will be referred to as a "length". Similarly, the distance in the vertical direction in, for example, FIG. 1A and FIG. 1B will be referred to as a "thickness" or a "height". Further, the side closer to the air bearing surface in the length direction (left side when viewed as, for example, FIG. 1A) will be referred to as the "front side (or in front)", while the side farther from the air bearing surface (right side when viewed as, for example, FIG. 1A) will be referred to as the "rear side (or behind)".

Figure 7:
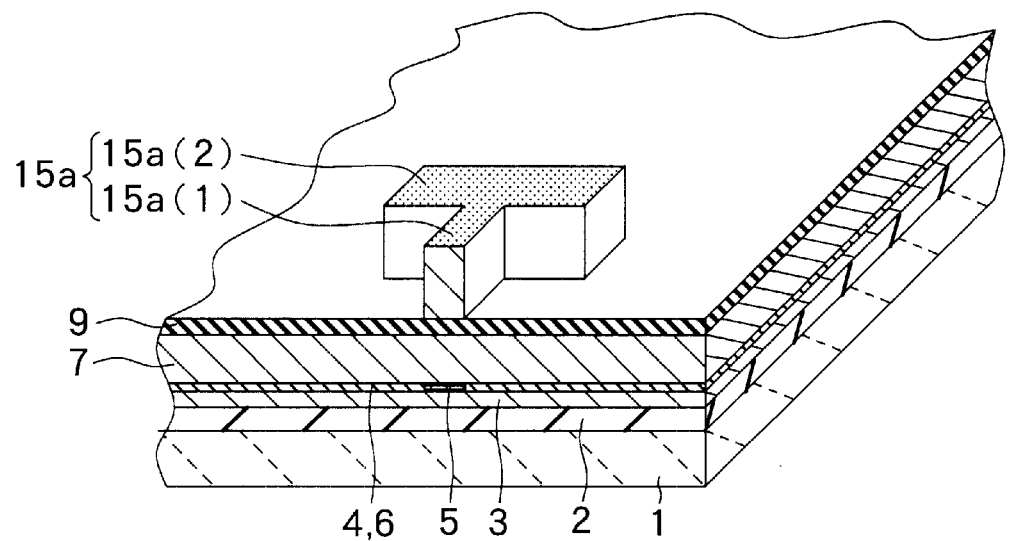
FIG. 7 is a perspective view corresponding to the cross sectional views shown in FIG. 1A and FIG. 1B.

According to the manufacturing method of this embodiment, as shown in FIG. 1A, FIG. 1B, and FIG. 7, an insulating layer 2 formed of, for example, alumina ($Al_2O_3$) and having a thickness of approximately 3 to 5 $\mu$m is first deposited on a substrate 1 formed of, for example, aluminum oxide and titanium carbide ($Al_2O_3$—TiC). On the insulating layer 2, a permalloy (NiFe) layer of approximately 3 $\mu$m in thickness is selectively formed by a plating method using a photoresist film as a mask, to thereby form a bottom shield layer 3 for a reproducing head.

As shown in the same figures, a layer of, for example, alumina having a thickness of approximately 100 to 200 nm is deposited on the bottom shield layer 3 by sputtering, thereby forming a shield gap film 4. An MR film 5 for constituting an MR element for reproduction is formed on the shield gap film 4 in thickness of tens of nanometers or less, and patterned to a desired shape through high precision photolithography. A lead layer (not shown) serving as an extraction electrode layer electrically connected to the MR film 5 is formed on both sides of the MR film 5. Thereafter, a shield gap film 6 is formed on the lead layer, the shield gap film 4, and the MR film 5, so that the MR film 5 is buried in the shield gap films 4 and 6. A top shield layer serving as a bottom pole (hereinafter referred to simply as a "bottom pole") 7 is then selectively formed of, for example, permalloy on the shield gap film 6 in thickness of approximately 3 to 4 $\mu$m by, for example, electrolytic plating.

As shown in the same figures, a write gap layer 9 of, for example, alumina having a thickness of approximately 0.15 to 0.3 $\mu$m is formed over the entire surface. At this time, an opening 9b is formed in the write gap layer 9, so that the bottom pole 7 is brought into contact with a top pole 20 (a top pole tip 15a, a magnetic path connection portion 15b, a top connection portion 20a, a magnetic path connection portion 20b, and a top yoke 20c) which will be formed in a later step. It should be noted that the above write gap layer 9 corresponds to one specific example of a "gap layer" of the invention.

Figure 12:
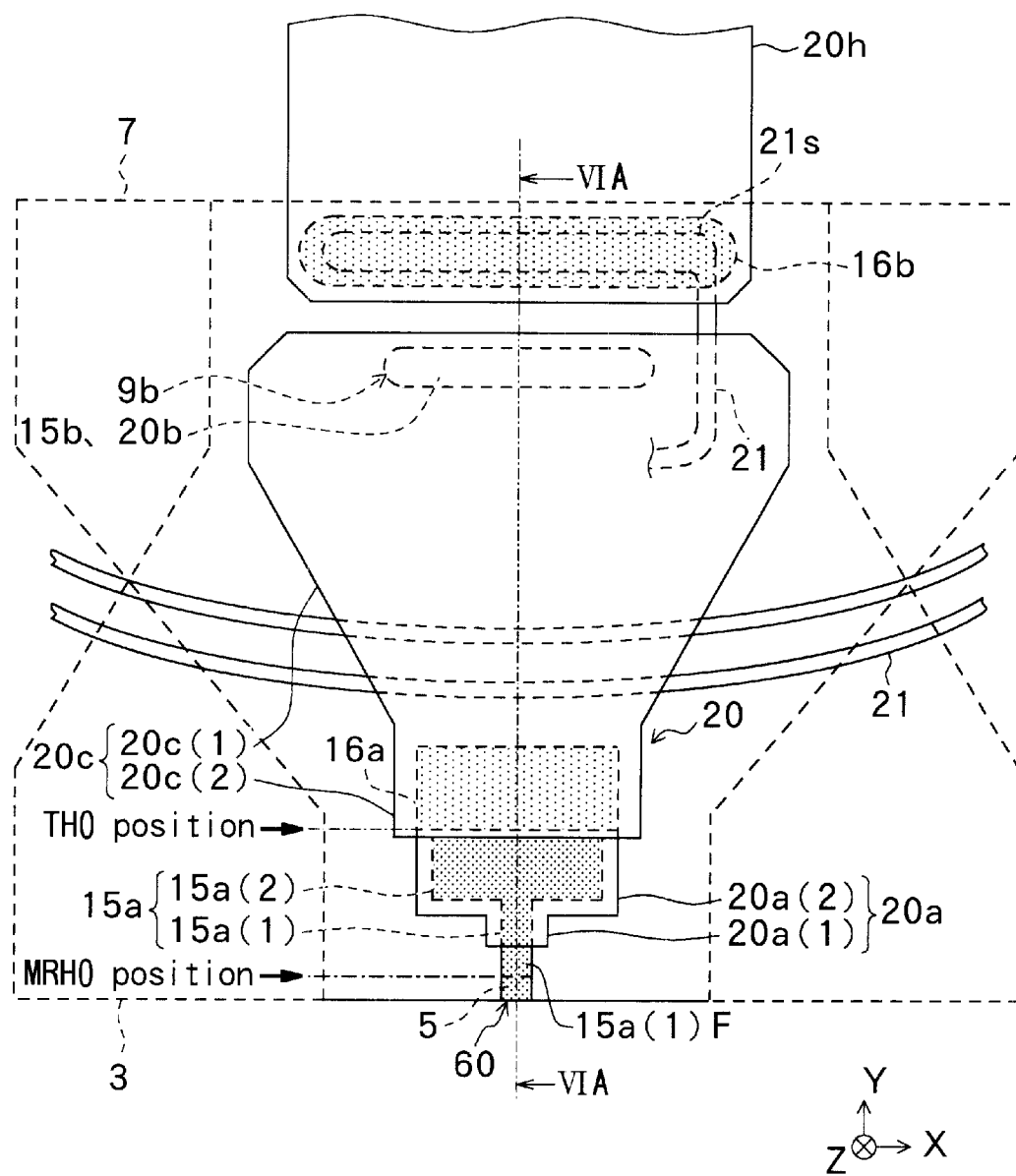
FIG. 12 is a plan view illustrating a structure of the thin film magnetic head according to the first embodiment of the invention.

As shown in the same figures, on a region of the flat write gap layer 9 located in front of the region where the thin film coil 21 will be disposed in a later step, the top pole tip 15a constituting part of the top pole 20 is formed in thickness of about 2 to 3 $\mu$m. As shown in FIG. 7 and FIG. 12 described hereinafter, the top pole tip 15a has a T-shaped plane, and has a tip portion 15a(1) having a constant width defining a recording track width on a recording medium (not shown), and an increased width portion 15a(2) having a width greater than that of the tip portion 15a(1). When the top pole tip 15a is formed, the magnetic path connection portion 15b constituting part of the top pole 20 is simultaneously formed in the opening 9b.

For the top pole tip 15a and the magnetic path connection portion 15b, high saturation magnetic flux density materials, such as a permalloy (NiFe) type alloy and an iron nitride (FeN) type alloy, and the like are used. In forming these portions, a wet process such as electrolytic plating, a dry process such as a sputtering deposition method, and the like can be used. Especially for this step, the top pole tip 15a can be formed by sputtering using an iron nitride type alloy because the underlying layer is the flat write gap layer 9. Although a layer of an iron nitride type alloy exhibits a decrease in magnetic flux transmitting characteristics due to crystal anisotropy when formed on a slope by a dry process, such as sputtering, such problems are not likely to be generated when it is formed on a flat surface. When an electrolytic plating method is used, either an iron nitride type alloy or permalloy can be used because such a problem of anisotropy is not raised.

When, for example, an electrolytic plating method, which is also called a frame plating method, is used, the top pole tip 15a and the magnetic path connection portion 15b are formed as follows. An NiFe type alloy, for example, is first formed in thickness of approximately 70 nm by, for example, sputtering, to thereby form an electrode film (not shown) serving as a seed layer in the electrolytic plating method. Photoresist is applied on the above electrode film and patterned through photolithography, to thereby form a photoresist pattern (not shown). Using this photoresist pattern as a mask, an electrolytic plating process is performed using the electrode film formed by the above-described step as a seed layer, thereby forming the top pole tip 15a and the magnetic path connection portion 15b. The photoresist pattern used as a mask is then removed.

Figure 8:
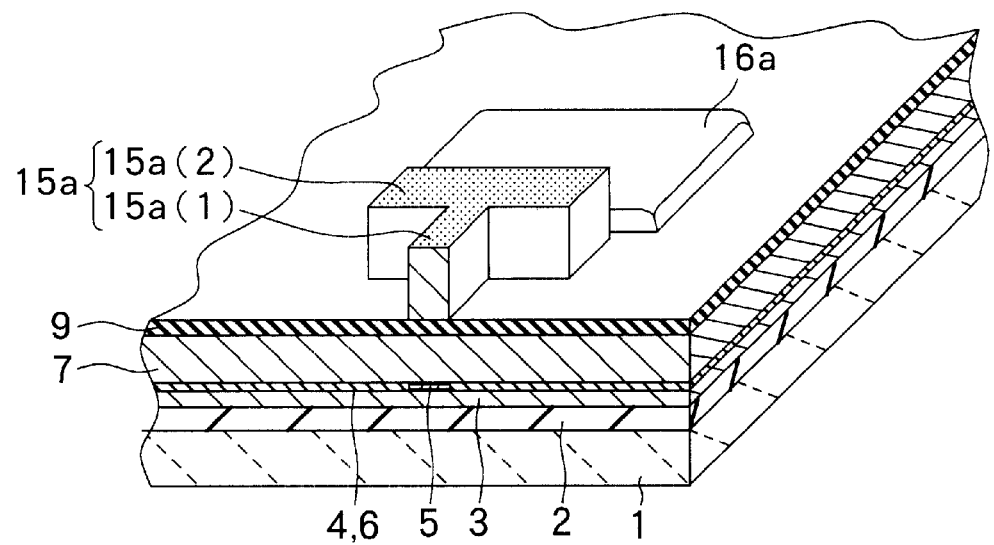
FIG. 8 is a perspective view for describing a step subsequent to the step shown in FIG. 7.

As shown in FIG. 2A, FIG. 2B, and FIG. 8, on a region of the write gap layer 9 behind the top pole tip 15a, an insulating film pattern 16a is formed of, for example, organic photoresist in thickness of about 0.3 to 2.0 $\mu$m through high precision photolithography. When the insulating film pattern 16a is formed, an insulating film pattern 16b is simultaneously formed on a region of the write gap layer 9 corresponding to an inner terminating end (hereinafter referred to simply as a "inner peripheral end") of the thin film coil 21 formed in a later step. A heat treatment at a temperature of, for example, about 200° C. to 250° C. is performed for the sake of planarizing the insulating film patterns 16a and 16b. As a result of this heat treatment, the insulating film patterns 16a and 16b are provided with a rounded slope in the vicinity of the edges thereof.

In forming the insulating film pattern 16a, the edge located foremost (hereinafter referred to simply as a "foremost end") may be positioned slightly (about 0.1 to 0.2 µm, for example) behind the edge located rearmost (hereinafter referred to simply as a "rearmost end") of the top pole tip 15a, or may be in line with the rearmost end of the top pole tip 15a. As described hereinafter, the position of the foremost end of the insulating film pattern 16a defines a throat height zero position (hereinafter denoted as "TH0 position") which is a reference position for determining the throat height. The rear end of the insulating pattern 16a reaches at least the region where the thin film coil 21 will be formed in a later step. The insulating pattern 16a preferably has a width greater than that of the increased width portion 15a(2) of the top pole tip 15a. It should be noted that the above insulating film pattern 16a corresponds to one specific example of a "first insulating layer portion" of the present invention.

Figure 9:
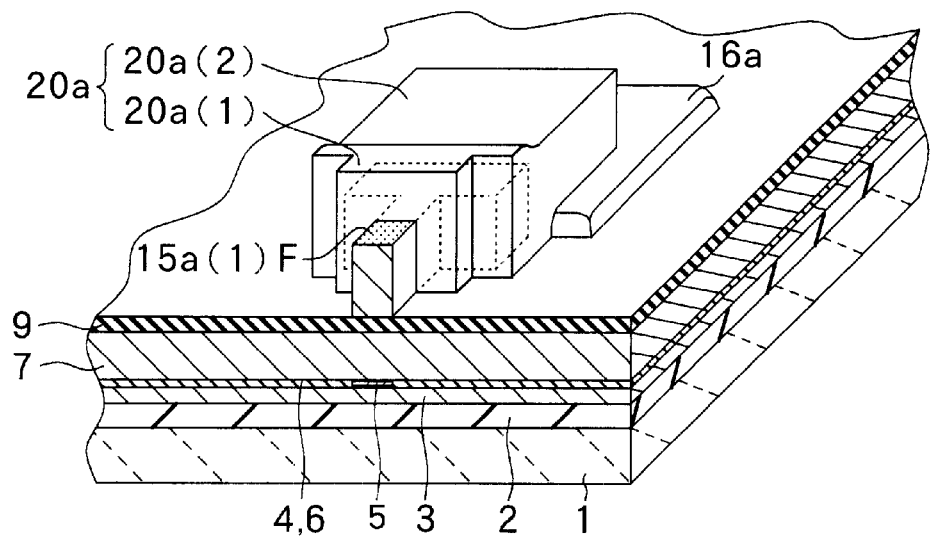
FIG. 9 is a perspective view corresponding to the cross sectional views shown in FIG. 2A and FIG. 2B.

As shown in FIG. 2A, FIG. 2B, and FIG. 9, the top connection portion 20a constituting part of the top pole 20 is formed in thickness of, for example, 2.0 to 3.0 µm to cover part of a rear region of the top pole tip 15a and part of a front region of the insulating film pattern 16a. This element is formed so that the top pole tip 15a is covered with the top connection portion 20a, except for part of the front portion of its tip portion 15a(1), from four directions, i.e. from the top, both sides, and the back. The top connection portion 20a has a planar shape as shown in, for example, FIG. 9 and FIG. 12 described hereinafter, and has a front portion 20a(1) and a rear portion 20a(2). The top pole tip 15a and the top connection portion 20a are magnetically coupled to each other through a contact portion therebetween. At the same time the top connection portion 20a is formed, the magnetic path connection portion 20b constituting part of the top pole 20 is selectively formed on the magnetic path connection portion 15b.

The top connection portion 20a and the magnetic path connection portion 20b are formed using, for example, high saturation magnetic flux density material, such as a permalloy type alloy or an iron nitride type alloy, by electrolytic plating, sputtering, or the like. It should be noted, however, that the electrolytic plating method is preferred to the sputtering method when a material that is likely to exhibit crystal anisotropy, such as the iron nitride type alloy, is employed to form these elements. This is because, as described above, forming an iron nitride type alloy film by a dry process, such as sputtering, causes crystal anisotropy at the sputtered film of the top connection portion 20a formed on the portion having differences in height (sloped portion of the insulating film pattern 16a), whereby magnetic flux transmitting characteristics are deteriorated and magnetic flux saturation is likely to be generated. The top pole tip 15a and the top connection portion 20a described above correspond to one specific example of a "first magnetic layer portion" of the invention.

Figures 3A, 3B:
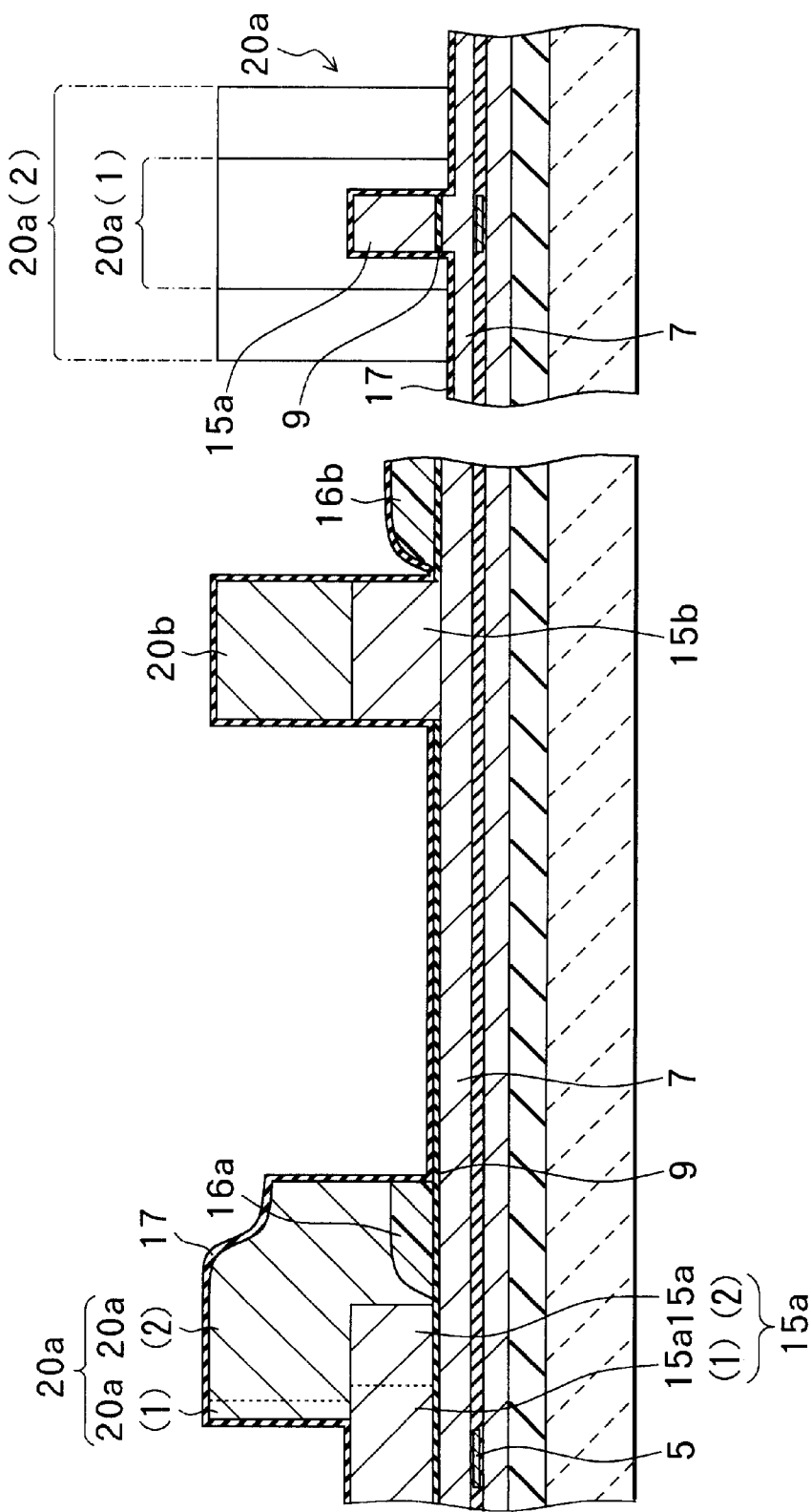
FIG. 3A and FIG. 3B are cross sectional views for describing a step subsequent to the step shown in FIG. 2A and FIG. 2B.

As shown in FIG. 3A, the part of the insulating film pattern 16a that extends rearward from the rear edge surface of the top connection portion 20a is removed by etching or the like.

Figure 10:
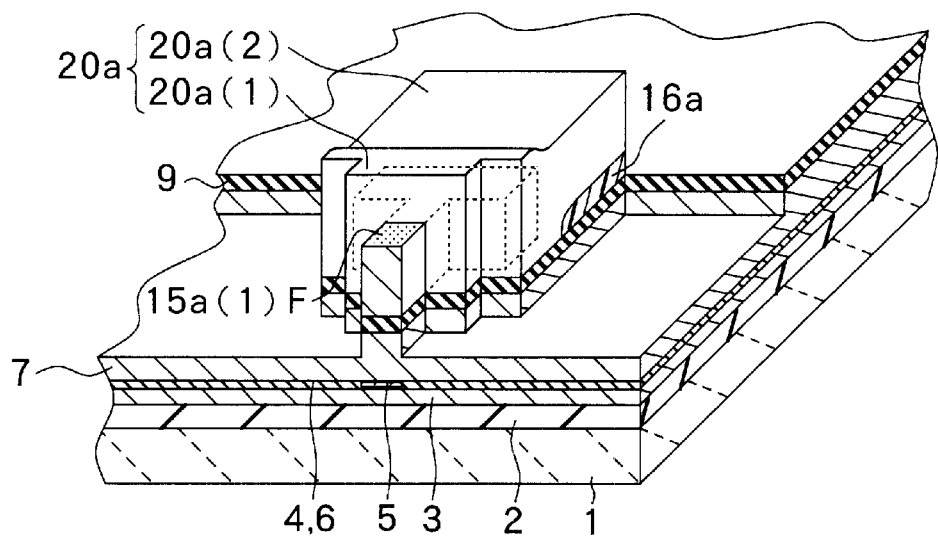
FIG. 10 is a perspective view corresponding to the cross sectional views shown in FIG. 3A and FIG. 3B.

As shown in FIG. 3B and FIG. 10, the write gap layer 9 and the bottom pole 7 are etched in a self-aligned manner by about 0.5 µm through, for example, dry etching in accordance with an RIE method using an ion milling method and a chlorine type gas ($Cl_2$, $CF_4$, $BCl_2$, $SF_6$, or the like), to thereby form a trim structure. This etching process is performed by using as a mask a photoresist film (not shown) selectively formed on the region located rearward from the rearmost end of the top connection portion 20a, and the part of the top pole (the tip portion 15a and the top connection portion 20a) located in front of the rearmost end of the top connection portion 20a.

As shown in FIG. 3A and FIG. 3B, an insulating film 17 of, for example, alumina is formed in thickness of 0.5 to 1.5 µm over the entire surface. The insulating film pattern 16b described above corresponds to one specific example of a "second insulating layer portion" of the invention.

Next, as shown in FIG. 4A and FIG. 4B, the thin film coil 21 for an inductive recording head is formed of, for example, copper (Cu) in thickness of 2 to 3 µm on the portion of the insulating film 17 located between the top connection portion 20a and the magnetic path connection portion 20b by, for example, electrolytic plating. At the same time the thin film coil 21 is formed, a coil connection portion 21s forming the inner peripheral end of the thin film coil 21 is formed on the part of the insulating film 17 covering the insulating film pattern 16b. The material and formation method of the coil connection portion 21s are the same as those of the thin film coil 21. The above thin film coil 21 corresponds to one specific example of a "first thin film coil pattern" of the invention, and the above coil connection portion 21s corresponds to one specific example of a "connection pattern" of the invention. Further, the thin film coil 21 and the coil connection portion 21s described above correspond to one specific example of a "thin film coil" of the invention.

As shown in the same figures, an insulating film 22 of, for example, alumina is formed in thickness of about 3 to 4 µm over the entire surface, thereby burying recesses of the uneven surface region formed by the top connection portion 20a, the magnetic path connection portion 20b, the thin film coil 21, the coil connection portion 21s, and the like. The above insulating film 22 corresponds to one specific example of a "third insulating layer portion" of the invention, and the insulating film patterns 16a and 16b, and the insulating film 22 correspond to one specific example of an "insulating layer" of the invention.

As shown in FIG. 5A and FIG. 5B, the entire surface of the insulating film 22 is polished and planarized by, for example, a chemical mechanical polishing (CMP) method. Here, the polishing process is continued until the top connection portion 20a, the magnetic path connection portion 20b, and the coil connection portion 21s are exposed. It should be noted that, since the coil connection portion 21s is disposed on the portion of the insulating film 17 raised by the insulating film pattern 16b, only the coil connection portion 21s is exposed at the polished surface while the thin film coil 21 remains buried in the insulating film 22.

As shown in FIG. 6A and FIG. 6B, on the part of the thus planarized region extending from the magnetic path connection portion 20b toward the top connection portion 20a, the top yoke 20c constituting part of the top pole 20 is selectively formed. At the same time, a coil connection wiring 20h is formed extending from the part located on the coil connection portion 21s toward an unillustrated external circuit. The coil connection wiring 20h is used for electrically connecting the coil connection portion 21s and the unillustrated external circuit. The top yoke 20c and the coil connection wiring 20h are formed in thickness of, for example, 2 to 3 µm using, for example, a high saturation magnetic flux density material, such as an iron nitride type alloy or a permalloy type alloy in accordance with an electrolytic plating method, a sputtering method, or the like. Especially in this step, an iron nitride type alloy can be used, similarly to the step of forming the top pole tip 15a, as the layer underlying the top yoke 20c has a surface planarized through CMP. This is because there is only a small likelihood of causing crystal anisotropy by forming the top yoke 20c through sputtering.

The top yoke 20c has, for example, such a planar shape as shown in FIG. 12 described hereinafter, and includes a yoke portion 20c(1) extending over the thin film coil 21, and a connection portion 20c(2) located in front of the yoke portion 20c(1) and extending so as to overlap part of the top connection portion 20a. The top yoke 20c is preferably formed so that its foremost end is positioned substantially in line with the rearmost end of the top pole tip 15a and that its rearmost end is positioned substantially in line with the rearmost end of the magnetic path connection portion 20b. The top yoke 20c is magnetically coupled to the bottom pole 7 through the magnetic path connection portions 15b and 20b in the opening 9b, and also to the top pole tip 15a through the top connection portion 20a. The above-described top yoke 20c corresponds to one specific example of a "second magnetic layer portion" of the invention, and the above-described coil connection wiring 20h corresponds to one specific example of a "conductive layer pattern" as a "wiring pattern" of the invention. Further, the above-described top pole 20 (the top pole tip 15a, the top connection portion 20a, the magnetic path connection portion 15b, the magnetic path connection portion 20b, and the top yoke 20c) corresponds to one specific example of a "one of the two magnetic layers" of the invention.

As shown in the same figures, the overcoat layer 23 is formed of, for example, alumina over the entire surface. Finally, an air bearing surface (track surface) 60 of the recording head and the reproducing head is formed by mechanical polishing using a slider or the like, thereby completing a thin film magnetic head of the present embodiment.

Structure of Important Part of Thin Film Magnetic Head According to First Embodiment A structure of an important part of a thin film magnetic head according to this embodiment will next be described with reference to FIG. 6A, FIG. 6B, and FIG. 12.

FIG. 12 is a plan view schematically illustrating a planar structure of the thin film magnetic head formed in accordance with the manufacturing method of the thin film magnetic head according to this embodiment. FIG. 6A shows the cross section taken along the line VIA—VIA in FIG. 12. In FIG. 12, the overcoat layer 23 and the like are not shown and the thin film coil 21 is indicated by only part of its turns at the outer periphery.

As described above, the position of the foremost end of the insulating film pattern 16a is the reference position defining a throat height TH, i.e. the throat height zero (TH0) position. The throat height TH is defined as the distance between the TH0 position and the air bearing surface 60. The "MRH0 position" in FIG. 12 indicates the position of the rearmost end of the MR film 5, i.e. the MR height zero position. The MR height is the distance between the MR height zero position (MRH0 position) and the air bearing surface 60.

As shown in FIG. 12, the top connection portion 20a has a front portion formed so as to surround part of the tip portion 15a(1) and the increased width portion 15a(2) of the top pole tip 15a from four directions, i.e. from the top, both sides, and the back, and magnetically coupled to the top pole tip 15a. Meanwhile, the rear portion of the top connection portion 20a occupies a region located on top of the insulating film pattern 16a, and a sufficient magnetic volume is secured in this region. The magnetic volume is defined herein as the allowable amount of the magnetic flux, i.e. the amount of the magnetic flux that can be contained in respective portions (respective magnetic layer portions) constituting a propagation path of the magnetic flux. The rear portion of the top connection portion 20a also contacts the connection portion 20c(2) of the top yoke 20c in a partially overlapping manner, and is magnetically coupled to the top yoke 20c.

A front portion (hereinafter referred to as a "portion 15a(1)F") of the tip portion 15a(1) of the top pole tip 15a is not covered with the top connection portion 20a, and is exposed. The portion 15a(1)F is the portion defining a recording track width of the recording medium during recording, and has a constant width formed with high precision. In FIG. 12, the top yoke 20c, the top connection portion 20a, and the top pole tip 15a are concentric in the width direction.

At its rear region, the top yoke 20c is magnetically coupled to the bottom pole 7 through the magnetic path connection portions 20b and 15b. Thus, the top pole tip 15a, the top connection portion 20a, the top yoke 20c, the magnetic path connection portions 20b and 15b, and the bottom pole 7 form one magnetic path.

The coil connection wiring 20h is electrically connected to the coil connection portion 21s and to the thin film coil 21 integrally formed with the coil connection portion 21s. A rear portion of the coil connection wiring 20h and an outer terminating end (hereinafter referred to simply as an "outer peripheral end"; not shown) of the thin film coil 21 are connected to an unillustrated external circuit, and through this coil connection wiring 20h electricity can be supplied to the thin film coil 21.

Functions of Thin Film Magnetic Head According to First Embodiment

Functions of the thin film magnetic head according to this embodiment will next be described with reference to FIG. 6A, FIG. 11, and FIG. 12. In the following description, the X-axis, Y-axis, and Z-axis directions shown in the drawings will be denoted as a "width (or width direction)", a "length (or length direction)", and a "thickness (or thickness direction)", respectively.

In this thin film magnetic head, a signal current is supplied from an unillustrated external circuit to the thin film coil 21 (not shown in FIG. 11) of the recording head portion during information recording operation. The magnetic flux generated in accordance with this signal current propagates from the yoke portion 20c(1) to the connection portion 20c(2) in the top yoke 20c, and further propagates through the rear portion 20a(2) magnetically coupled to the connection portion 20c(2) and the front portion 20a(1) of the top connection portion 20a, and through the increased width portion 15a(2) of the top pole tip 15a into the portion 15a(1)F of the tip portion 15a(1). The magnetic flux reaching the portion 15a(1)F further propagates to the very tip portion thereof (the air bearing surface 60). The magnetic flux reaching the very tip of the portion 15a(1)F generates a signal magnetic field at an external region. This signal magnetic field performs information recording into an unillustrated recording medium. In order to ensure excellent overwrite characteristics in the thin film magnetic head performing such recording operation, it is necessary to supply the magnetic flux generated at the thin film coil 21 smoothly and sufficiently to the tip portion of the portion 15a(1)F.

During information reproducing operation, on the other hand, the signal magnetic field from the unillustrated recording medium is applied to the MR film 5 of the reproducing head portion. In the MR film 5, the resistance is varied in accordance with the applied signal magnetic field, thereby varying the magnitude of a sense current flowing therethrough. This sense current is converted to, for example, a signal voltage, which is output to an external circuit (not shown). Through such operation, information is read out from the recording medium.

Figure 11:
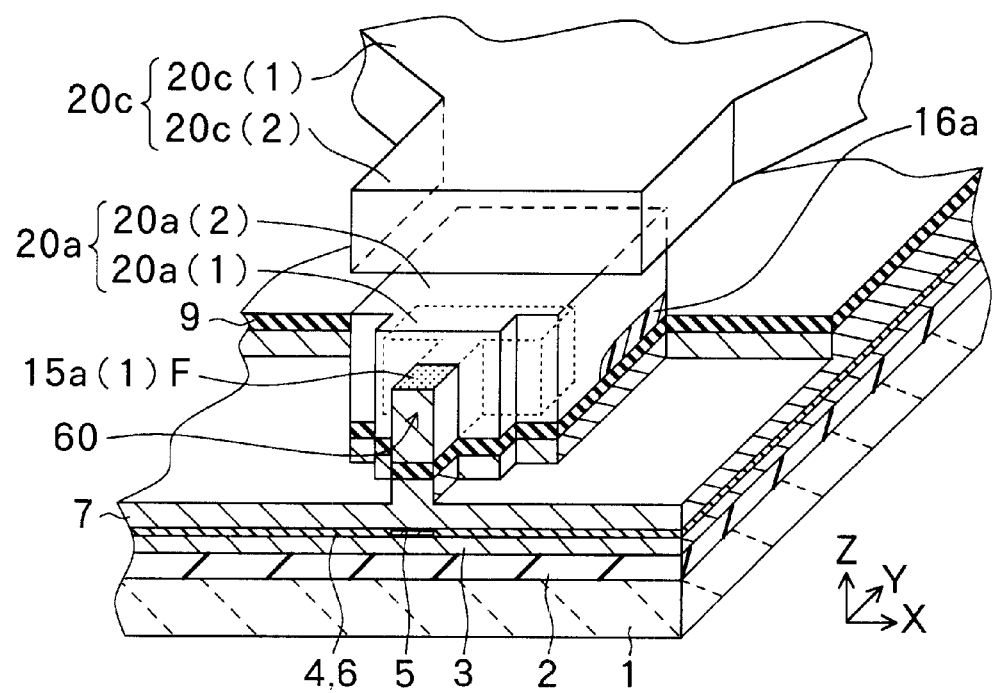
FIG. 11 is a perspective view corresponding to the cross sectional views shown in FIG. 6A and FIG. 6B.

As shown in FIG. 11, in this thin film magnetic head, the widths of the respective portions constituting the propagation path of the magnetic flux from the top yoke 20c to the portion 15a(1)F are reduced in steps as it approaches the portion 15a(1)F, so that the magnetic volume therein is decreased in steps. Consequently, the magnetic flux generated at the thin film coil 21 is converged in steps in accordance with the decrease in magnetic volume in the width and thickness directions of the respective portions as it propagates through the above respective portions, so that the flux sufficiently reaches the tip of the portion 15a(1)F without any saturation during propagation. Especially in this embodiment, the top connection portion 20a completely surrounds the increased width portion 15a(2) of the top pole tip 15a from the four directions (from the top, both sides, and the back), and also surrounds part of the tip portion 15a(1) from three directions (from the top and both sides), whereby a contact area between the top pole tip 15a and the top connection portion 20a is increased and a propagation loss of the magnetic flux at the bordering surface (contact surface) between the two is decreased. As a result, excellent overwrite characteristics can be ensured.

Functions and Effects of Method of Manufacturing Thin Film Magnetic Head

With reference to FIG. 6A, FIG. 6B, and FIG. 13, characteristic functions and effects provided by the method of manufacturing a thin film magnetic head according to this embodiment will be described comparing with an example method of manufacturing a thin film magnetic head. In the following description, only the steps different between the two methods will be described, and the rest of the steps will not be described because they are the same as those described above.

Figures 13A, 13B:
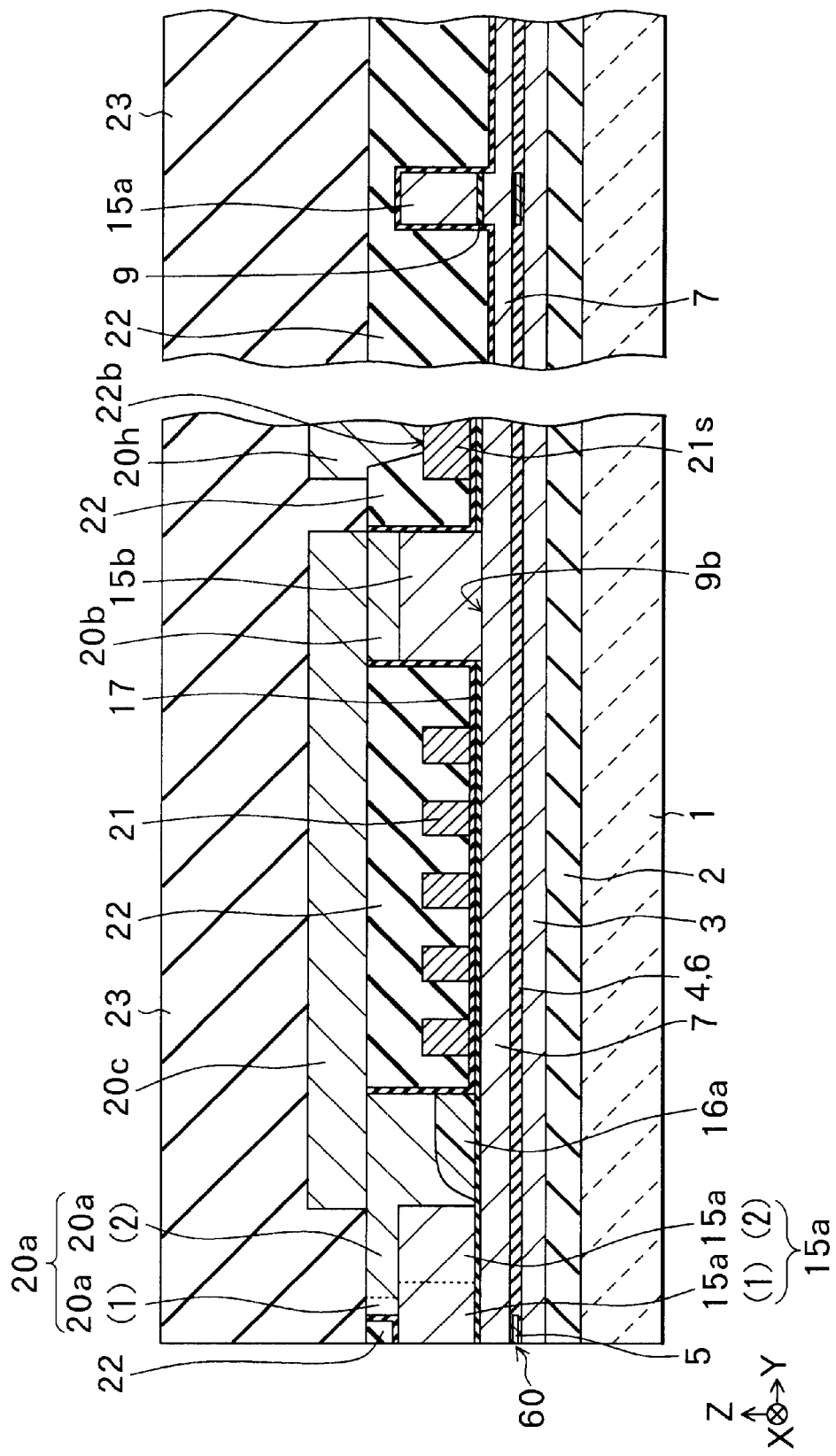
FIG. 13A and FIG. 13B are cross sectional views for describing an example of a method of manufacturing a thin film magnetic head in comparison with the method of manufacturing a thin film magnetic head according to the first embodiment of the invention.

FIG. 13A and FIG. 13B are cross sectional views for explaining an example method of manufacturing a thin film magnetic head in comparison with the method of manufacturing a thin film magnetic head of this embodiment, and correspond to the cross sectional views shown in FIG. 6A and FIG. 6B described above, respectively. In FIG. 13A and FIG. 13B, the elements identical to those in FIG. 6A and FIG. 6B are labeled with the same reference numerals and characters. In the method of manufacturing a thin film magnetic head as an comparison example shown in FIG. 13A and FIG. 13B, the insulating film pattern 16b is not disposed at a region corresponding to an inner peripheral end of the thin film coil 21 provided in a later step, and instead the coil connection portion 21s is formed directly on an underlying layer (insulating layer 17) coplanar with the layer (insulating layer 17) underlying the thin film coil 21. When such a manufacturing method is used, the upper surface of the thin film coil 21 is positioned flush with that of the coil connection portion 21s. As a result, when the insulating film 22 is formed and then the surface thereof is polished by CMP to expose the upper connection portion 20a, the magnetic path connection portion 20b, and the coil connection portion 21s, even the thin film coil 21 is also exposed. If the thin film coil 21 is thus exposed, the top yoke 20c to be formed thereon in a later step will be in contact with the thin film coil 21, and therefore these two elements cannot be isolated by the insulating film 22. If, after forming the insulating film 22, the surface of the insulating film 22 is polished until the top connection portion 20a and the magnetic path connection portion 20b are exposed, the coil connection portion 21s cannot be exposed at the polished surface because the insulating film 22 is provided on, and covers, the coil connection portion 21s. Thus, in order for the coil connection portion 21s and the coil connection wiring 20h which will be formed in a later step to be electrically connected with each other, an additional step is required for forming an opening 22b by partially removing the insulating film 22 interposed therebetween through, for example, etching.

In contrast, according to the method of manufacturing a thin film magnetic head of this embodiment shown in FIG. 6A and FIG. 6B, an insulating film pattern 16b is formed in advance at a region corresponding to the inner peripheral end of the thin film coil 21 to be formed in a later step, so that the upper surface of the layer in the region underlying the coil connection portion 21s is positioned higher than that of the layer in the region underlying the thin film coil 21. As a result, the upper surface of the coil connection portion 21s disposed by the step same as that of forming the thin film coil 21 is also positioned higher than that of the thin film coil 21. In accordance with such a manufacturing method, when the insulating film 22 is formed and the upper surface thereof is polished by CMP until the top connection portion 20a, the magnetic path connection portion 20b, and the coil connection portion 21s are exposed, the coil connection portion 21s, as well as the top connection portion 20a and the magnetic path connection portion 20b, can be exposed without exposing the thin film coil 21, which remains buried in the insulating film 22. Consequently, according to the manufacturing method of this embodiment, the coil connection portion 21s and the coil connection wiring 20h can be electrically connected without requiring the step of forming the opening 22b described in connection with the above comparison example of the manufacturing method (FIG. 13A and FIG. 13B). In addition, because the thin film coil 21 remains covered with the insulating film 22, insulation effect between the thin film coil 21 and the top yoke 20c can be ensured. Further, according to the manufacturing method of this embodiment, the insulating film pattern 16b is formed by the step same as that of forming the insulating film pattern 16a, and therefore no additional steps are required for forming the insulating film pattern 16b.

As described above, according to the method of manufacturing a thin film magnetic head of this embodiment, the insulating film pattern 16b is formed in advance at a region corresponding to the inner peripheral end of the thin film coil 21 by the step same as that of forming the insulating film pattern 16a for defining the throat height zero (TH0) position, and the coil connection portion 21s is disposed on this insulating film pattern 16b. Consequently, the step of forming the opening 22b, required in the comparison example shown in FIG. 13A and FIG. 13B, is not necessary because of the reason stated above. In addition, insulation effect between the thin film coil 21 and the top yoke 20c can be secured. Further, according to the present embodiment, the insulating film pattern 16b is formed by the step same as that of forming the insulating film pattern 16a, so that no additional steps are required for forming the insulating film pattern 16b. As a result, the number of manufacturing steps can be reduced for manufacturing the thin film magnetic head of this embodiment.

Since in this embodiment the insulating film pattern 16a is formed using, for example, photoresist that exhibits flowability when heated, it is easy to provide the insulating film pattern 16a with a sloped surface in the vicinity of the outer edge. Especially in such a case, the magnetic flux can be smoothly propagated from the top yoke 20c through the top connection portion 20a to the top pole tip 15a by providing a sloped surface at a front portion of the insulating film pattern 16a.

As the insulating film 22 for burying the thin film coil 21 and the like is formed of, for example, alumina in this embodiment, deterioration in polishing characteristics upon polishing the surface of the insulating film 22 by CMP, such as clogging at the polished surface, can be prevented, and the polished surface can be formed more smoothly, contrary to the case where the insulating film 22 is formed of a soft material, such as photoresist.

Further, as the top yoke 20c is formed on the planarized portion obtained through polishing by CMP in this embodiment, a photoresist pattern for forming the top yoke 20c can be formed by photolithography with higher precision.

Variation of Thin Film Magnetic Head of First Embodiment

It should be noted that planar shapes of the top pole tip 15a, the top connection portion 20a, and the top yoke 20c of this embodiment are not limited to those described above, and numerous variations are possible as long as the above-described propagation characteristics of the magnetic flux are not inhibited. A number of variations of this embodiment will now be described below. In the drawings illustrating the variations, the components identical to those in the above-described drawings will be denoted by the identical numerals and characters, and description thereof will not be repeated.

Variation 1-1

Figure 14:
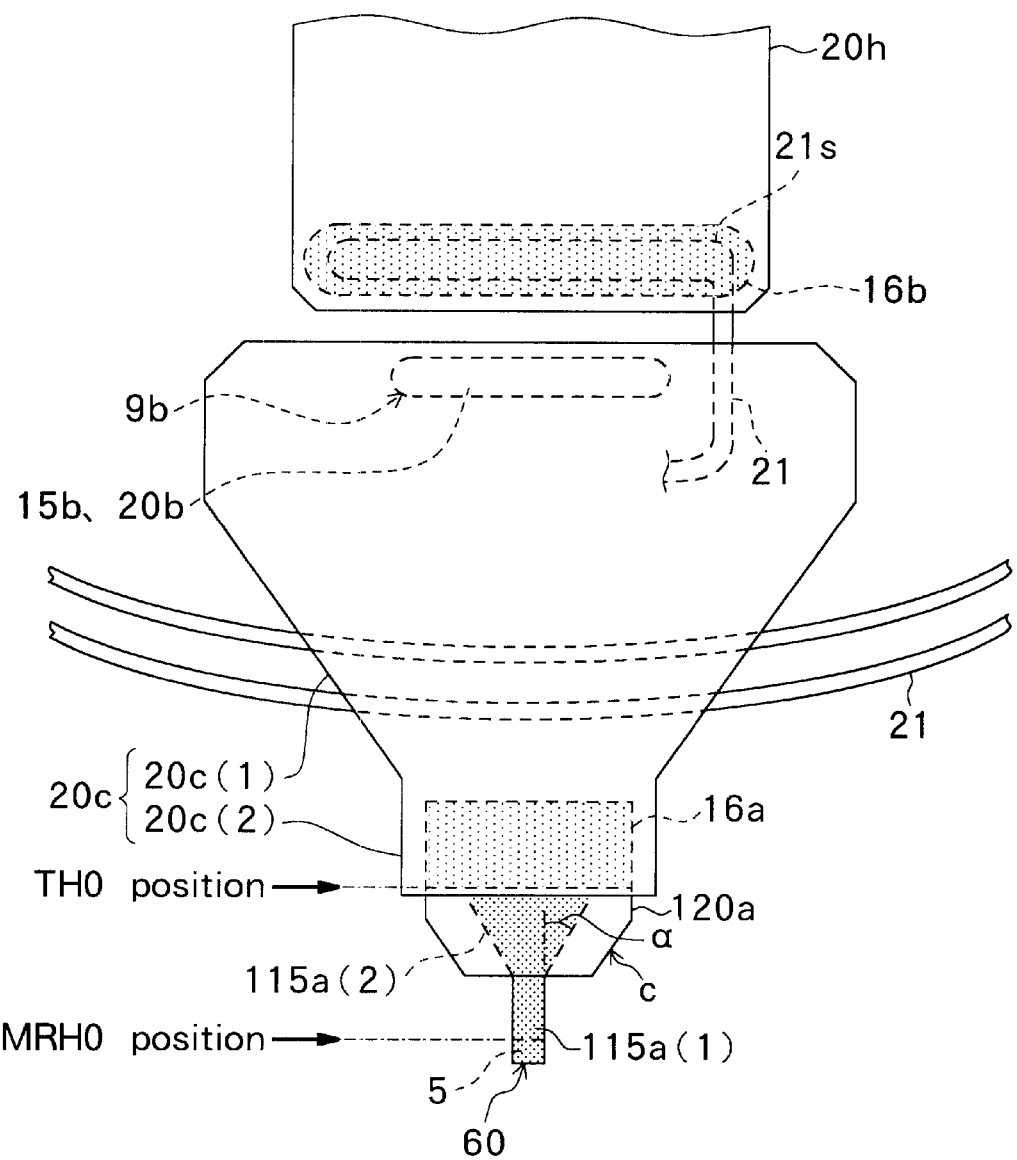
FIG. 14 is a plan view illustrating a structure of a thin film magnetic head according to a variation of the first embodiment of the invention.

FIG. 14 shows a variation where the width of an increased width portion 115a(2) of a top pole tip 115a is gradually increased as it becomes farther from the air bearing surface 60. Also in this variation, a big chamfered portion C is provided at each side corner of a front portion of a top connection portion 120a. The top connection portion 120a does not cover a tip portion 115a(1), but covers only the increased width portion 115a(2) having a tapered shape from three directions. An angle α of a side edge surface of the increased width portion 115a(2) to the length direction is preferably, for example, 30 to 60 degrees. The rest of the features of the structure and the manufacturing method, such as reduction in number of manufacturing steps and the like, are the same as those described in connection with FIG. 12. The top pole tip 115a and the top connection portion 120a described above correspond to one specific example of a "first magnetic layer portion" of the invention.

Variation 1-2

Figure 15A:
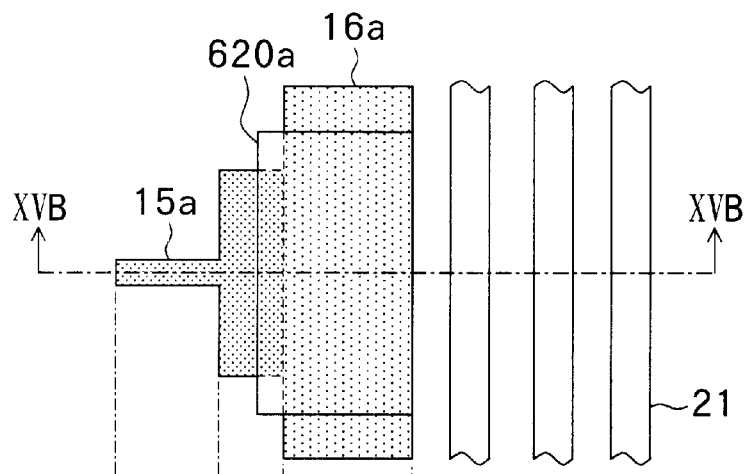
FIG. 15A and FIG. 15B are a plan view and a cross sectional view, respectively, illustrating a method of manufacturing a thin film magnetic head according to another variation of the first embodiment of the invention.
Figure 15B:
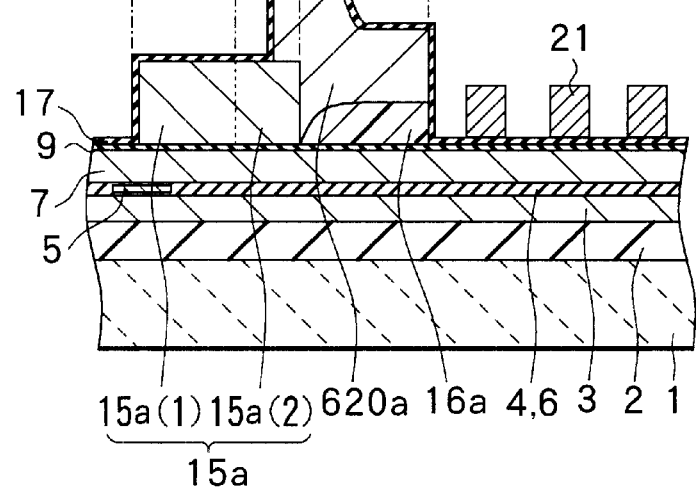

FIG. 15A, FIG. 15B, FIG. 16A and FIG. 16B are the views used for explaining another variation, illustrating the structure of an important part of a thin film magnetic head of this variation at a major manufacturing step. FIG. 15A and FIG. 16A are plan views, and FIG. 15B and FIG. 16B are cross sectional views taken along the line XVB—XVB in FIG. 15A and the line XVIB—XVIB in FIG. 16A, respectively.

In this variation, as shown in FIG. 15A and FIG. 15B, the top pole tip 15a having a T-shaped plane, similarly to the one shown in FIG. 12, and the insulating film patterns 16a and 16b (the insulating film pattern 16b is not shown in FIG. 15A or FIG. 15B; see FIG. 2A and FIG. 2B for details) are formed on the write gap layer 9. Thereafter, a top connection portion 620a is formed having a square plane and covering part of the increased width portion 15a(2) of the top pole tip 15a and the part of the insulating film pattern 16a. It should be noted that the top pole tip 15a and the insulating film pattern 16a may be in contact with each other, as shown in the figure, or may be separated by a small distance. The top connection portion 620a preferably has a width greater than the width of the increased width portion 15a(2) of the top pole tip 15a. The top pole tip 15a and the top connection portion 620a described above correspond to one specific example of a "first magnetic layer portion" of the invention.

The part of the insulating film pattern 16a that extends rearward from the rear end of the top connection portion 620a is removed through, for example, etching or the like. After forming the insulating film 17, the thin film coil 21, and the coil connection portion 21s (which is not shown in FIG. 15A or FIG. 15B; see FIG. 4A and FIG. 4B for details), the insulating film 22 is formed over the entire surface, and a CMP method is performed to polish and planarize the entire surface. In contrast to the case described above with reference to FIG. 5A and FIG. 5B, the polishing step by CMP is continued until both of the top pole tip 15a and the top connection portion 620a are exposed as shown in FIG. 16A and FIG. 16B. Through such steps, the top connection portion 620a is formed covering the increased width portion 15a(2) of the top pole tip 15a so as to be in contact only with part of the both side surfaces and the rear surface of the increased width portion 15a(2). It should be noted that the unillustrated coil connection portion 21s is also exposed (see FIG. 5A and FIG. 5B). The subsequent steps are the same as those of the embodiment described above. That is, the top yoke 20c (not illustrated in FIG. 15A, FIG. 15B, FIG. 16A, or FIG. 16B) having a planar shape similar to that shown in FIG. 12 is formed on the planarized surface, followed by the steps of forming the overcoat layer and the like.

As the polishing and planarizing step by CMP is continued to expose not only the top pole 620c but also the increased width portion 15a(2) in this variation, the entire element structure can be reduced in thickness. The other effects are the same as those of the first embodiment described above.

Variation 1-3

Figure 17:
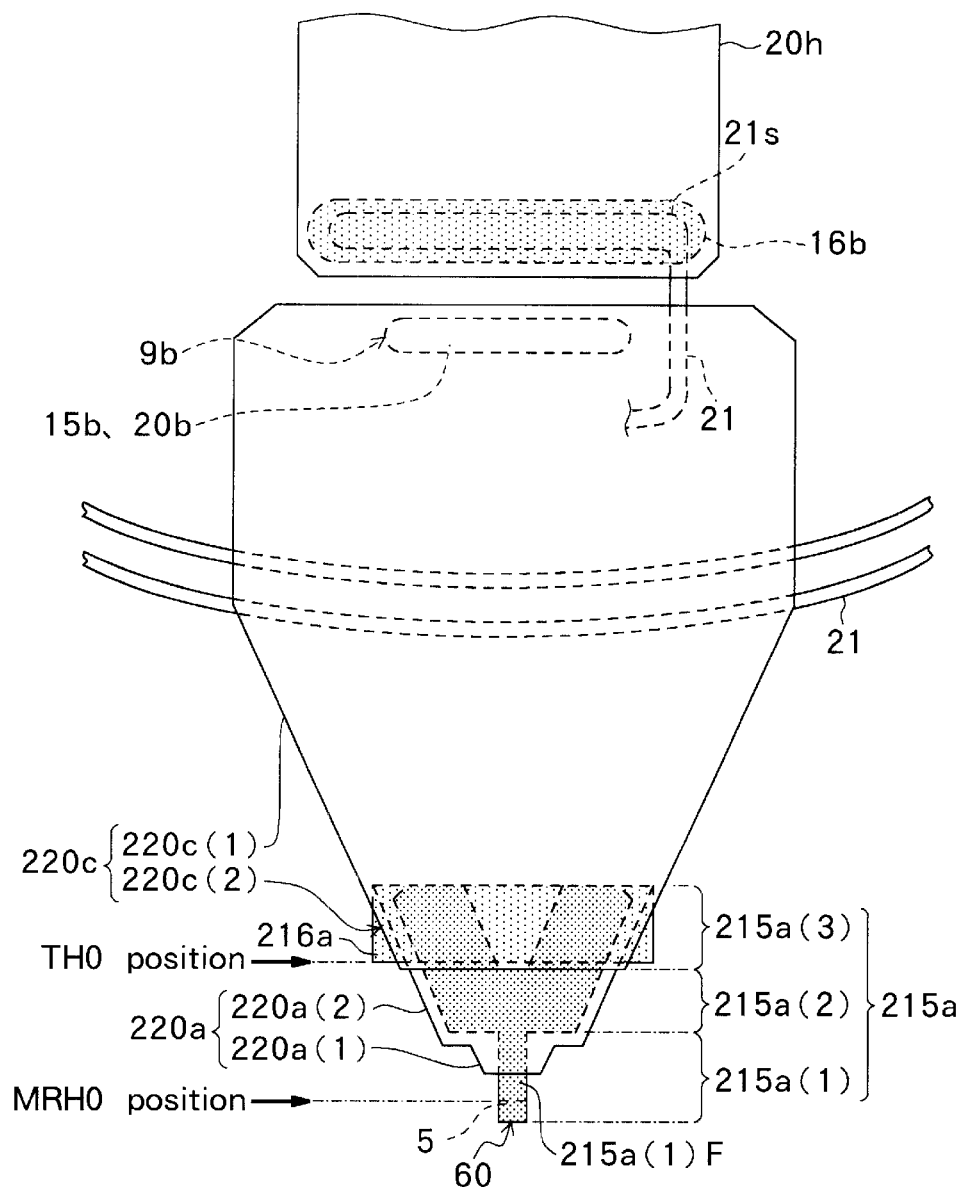
FIG. 17 is a plan view illustrating a structure of a thin film magnetic head according to still another variation of the first embodiment of the invention.

FIG. 17 is a plan view illustrating a planar structure of an important part of a thin film magnetic head according to still another variation. In the thin film magnetic head shown in this figure, a top pole tip 215a includes a tip portion 215a(1), an increased width portion 215a(2), and two arm portions 215a(3), formed integrally. The arm portion 215a(3) is coupled to a rear end of the increased width portion 215a(2). An insulating film pattern 216a has a square plane. The arm portion 215a(3) of the top pole tip 215a extends from the TH0 position near the rear end of the increased width portion 215a(2), over the insulating film pattern 216a, to the rear edge of the insulating film pattern 216a. The spacing between the arm portions 215a(3) gradually increases as it becomes farther from the air bearing surface 60. The two outer edge surfaces of the arm portions 215a(3) are coplanar with the respective two outer edge surfaces of the increased width portion 215a(2), and the spacing between the two is increased as it becomes farther from the air bearing surface 60. The side edges of a connection portion 220c(2) and a yoke portion 220c(1) of the top pole are substantially in parallel to the outer edge of the arm portion 215a(3).

The foremost end of the top pole 220c is positioned in the vicinity of the TH0 position. The planar shapes of the top yoke 220c near its foremost end and of a rear portion 220a(2) of a top connection portion 220a substantially correspond to the planar shape of the top pole tip 215a. The side edge surface of a front portion 220a(1) of the top connection portion 220a is substantially in parallel to that of the rear portion 220a(2). The angles of the outer edge surfaces of the increased width portion 215a(2) and the arm portion 215a(3) of the top pole tip 215a in the width direction, and the side edge surface of the top connection portion 220a, to the surface perpendicular to the air bearing surface are preferably in the range of, for example, 30 to 70 degrees. The top pole tip 215a and the top connection portion 220a described above correspond to one specific example of a "first magnetic layer portion" of the invention, and the above-described top yoke 220c corresponds to one specific example of a "second magnetic layer portion". The above-described insulating film pattern 216a corresponds to one specific example of a "first insulating layer portion".

In this variation, the top pole tip 215a has a part (arm portion 215a(3)) provided on a sloped surface of the insulating film pattern 216a, and therefore the top pole tip 215a is preferably formed by plating when, for example, iron nitride is employed. When permalloy is used, however, it can be formed through a dry process, such as sputtering. The features in structure and manufacturing method, such as reduction in number of manufacturing steps, other than those described above are the same as those of the head shown in FIG. 12.

Variation 1-4

Figure 18:
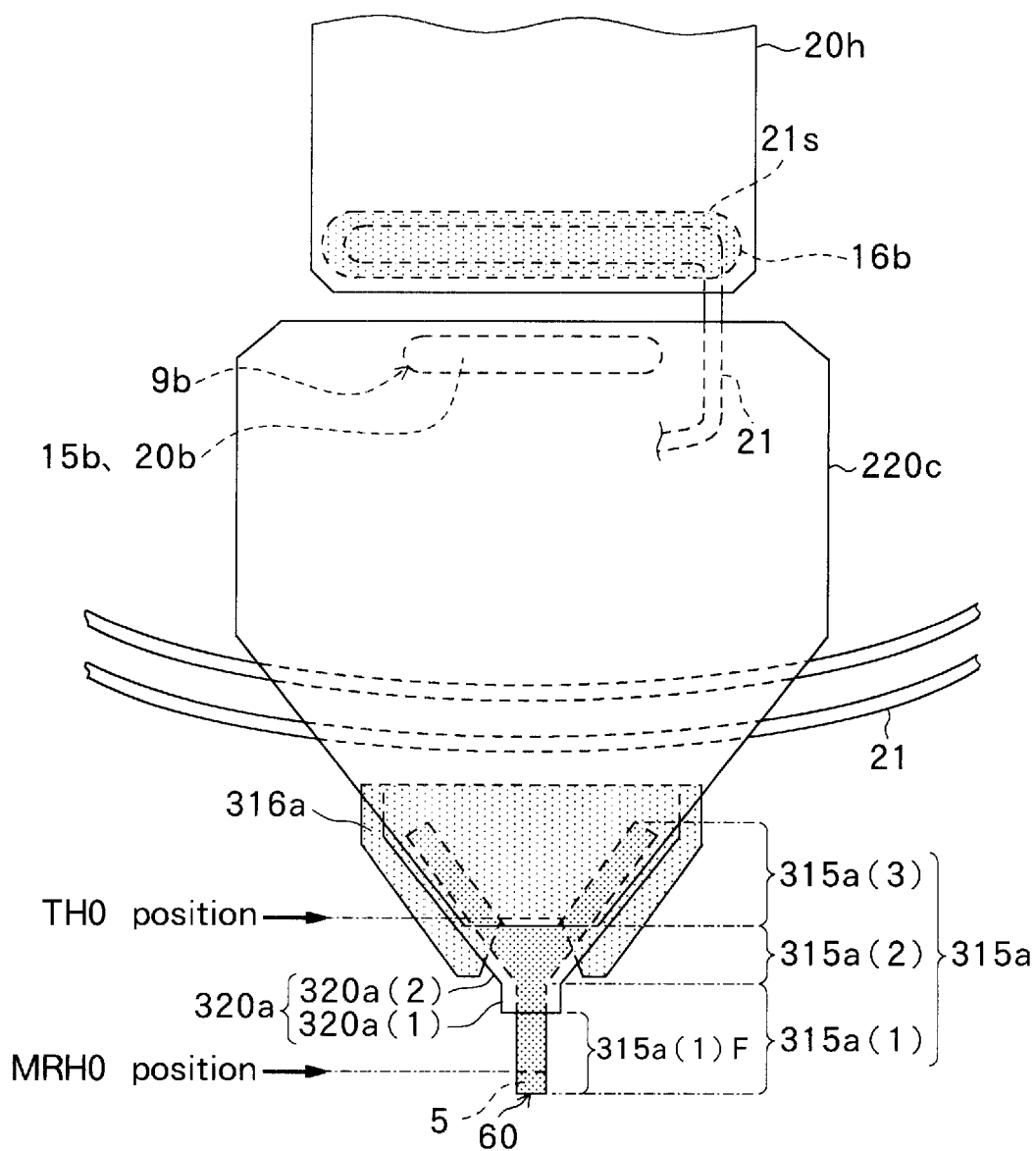
FIG. 18 is a plan view illustrating a structure of a thin film magnetic head according to a further variation of the first embodiment of the invention.

FIG. 18 is a plan view illustrating a planar structure of an important part of a thin film magnetic head according to a further variation. In the thin film magnetic head shown in this figure, a top pole tip 315a includes a tip portion 315a(1), an increased width portion 315a(2), and two arm portions 315a(3), formed integrally. The arm portion 315a(3) is thinner than the arm portion 215a(3) in FIG. 17 described above, and coupled to a rear end of the increased width portion 315a(2). The arm portion 315a(3) extends from the rear end (in the vicinity of the TH0 position) of the increased width portion 315a(2) over an insulating film pattern 316a, and ends before reaching a rear edge of the insulating film pattern 316a. The outline of the insulating film pattern 316a in the width direction mostly runs along the arm portions 315a(3) of the top pole tip 315a forming a Y-shape. Except for the region corresponding to the increased width portion 315a(2) of the top pole tip 315a, the insulating film pattern 316a protrudes forward beyond the TH0 position, and ends in the vicinity of the rearmost end of the tip portion 315a(1) (that is, in the vicinity of the foremost end of the increased width portion 315a(2)). The top connection portion 320a has a front portion 320a(1) whose side edge surface is substantially in parallel to the side edge surface of the tip portion 315a(1) of the top pole tip 315a, and a rear portion 320a(2) whose side edge surface at a front portion is substantially in parallel to the side edge surface of the top yoke 220c at a front portion. The top pole tip 315a and the top connection portion 320a described above correspond to one specific example of a "first magnetic layer portion" of the invention, and the above-described insulating film pattern 316a corresponds to one specific example of a "first insulating layer portion".

In this variation, the top pole tip 315a has a part (arm portion 315a(3)) provided on a sloped surface of the insulating film pattern 316a, and therefore the top pole tip 315a is preferably formed by plating when, for example, an iron nitride type alloy is employed, as in the above Variation 1-3. When permalloy is used, however, it can be formed through a dry process, such as sputtering. The features in structure and manufacturing method, such as reduction in number of manufacturing steps, other than those described above are the same as those of the head shown in FIG. 12.

Variation 1-5

Figure 19:
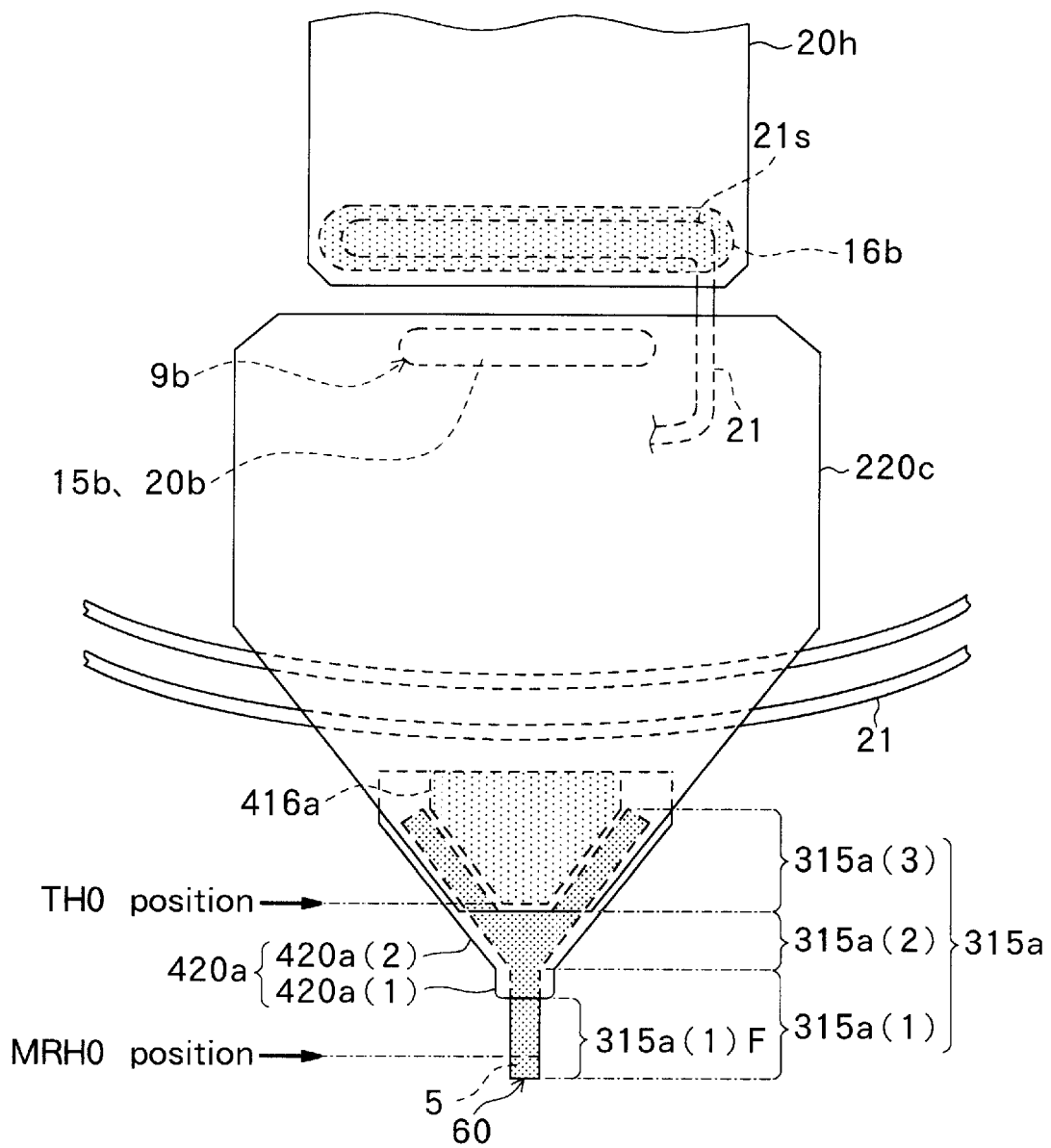
FIG. 19 is a plan view illustrating a structure of a thin film magnetic head according to a further variation of the first embodiment of the invention.

FIG. 19 is a plan view illustrating a planar structure of an important part of a thin film magnetic head according to a further variation. The thin film magnetic head of this variation includes the top pole tip 315a having the same shape as the top pole tip shown in FIG. 18. An insulating film pattern 416a is provided only in a region sandwiched by the two arm portions 315a(3) (cleaved region in the Y-shaped area). Therefore, the arm portion 315a(3) is not provided over the insulating film pattern 416a. A top connection portion 420a has almost the same shape as the top connection portion 320a shown in FIG. 18, except that the corner of a front portion 420a(1) is rounded off. The rest of the structural features are substantially the same as those of the head shown in FIG. 18. The top pole tip 315a and the top connection portion 420a described above correspond to one specific example of a "first magnetic layer portion" of the invention, and the above-described insulating film pattern 416a corresponds to one specific example of a "first insulating layer portion".

As the top pole tip 315a is not provided over the insulating film pattern 416a and is provided entirely on the write gap 9 in this variation, the top pole tip 315a can be formed through a dry process, such as sputtering, even when, for example, an iron nitride type alloy is used. The features in structure and manufacturing method, such as reduction in number of manufacturing steps, other than those described above are the same as those of the head shown in FIG. 12.

In the thin film magnetic heads shown in FIG. 17 through FIG. 19, the top pole tip 215a (315a) has a Y-shaped plane, and the top connection portion 220a (320a, 420a) surrounds not only the increased width portion 215a(2) (315a(2)) but also the two arm portions 215a(3) (315a(3)) from three directions. As a result, the contact area between the top pole tip 215a (315a) and the top connection portion 220a (320a, 420a) can be further increased, thereby further reducing propagation loss of magnetic flux at the interface between the two.

In the variations shown in FIG. 17 and FIG. 18, the top pole tip 215a, 315a is provided on top of the insulating film pattern 216a, 316a. Therefore, if, for example, an iron nitride type alloy is used as a material of the top pole tip, it is preferably formed by a plating method, rather than a dry process such as sputtering, so as to avoid crystal anisotropy in the film. Meanwhile, in the variation shown in FIG. 19, the top pole tip 315a is not provided on top of the insulating film pattern 416 but extends only on the flat write gap layer 9. Consequently, the top pole tip 315a thus structured can be formed through such process as sputtering, as in the first embodiment, even if an iron nitride type alloy is used.

Variation 1-6

FIG. 20A and FIG. 20B illustrate a structure of an important part of a thin film magnetic head at a major manufacturing step according to a further variation. FIG. 20A shows a planar structure of the important part, and FIG. 20B shows the cross section taken along a line XXB—XXB in FIG. 20A.

According to this variation, as shown in FIG. 20A and FIG. 20B, after a rectangular insulating film pattern 516a defining the TH0 position and the insulating film pattern 16b (not shown in FIG. 20A or FIG. 20B; see FIG. 2A and FIG. 2B) are formed on the write gap layer 9, the top pole tip 315a having the same shape as that shown in FIG. 18 is formed so that its arm portion 315a(3) is disposed on the insulating film pattern 516a. When the top pole tip 315a is formed of, for example, an iron nitride type alloy, it is preferably formed by a plating method, rather than a dry process such as sputtering.

A top connection portion 520a having a substantially trapezoidal planar shape is formed covering part of the increased width portion 315a(2) of the top pole tip 315a and part of the insulating film pattern 516a. The top pole tip 315a and the insulating film pattern 516a may be spaced apart by a very small distance as shown, or may be in contact with each other. The top connection portion 520a is preferably formed surrounding the increased width portion 315a(2) and the arm portion 315a(3) of the top pole tip 315a from three directions. While the foremost end of the top connection portion 520a is positioned in line with the rearmost end of the tip portion 315a(1) in this variation, it may be extended to cover part of the tip portion 315a(1). The top pole tip 315a and the top connection portion 520a described above corresponds to one specific example of a "first magnetic layer portion" of the invention, and the above insulating film pattern 516a corresponds to one specific example of a "first insulating layer portion".

After forming the insulating film 17, the thin film coil 21, and the coil connection portion 21s (which is not shown in FIG. 20A or FIG. 20B; see FIG. 5A and FIG. 5B), the insulating film 22 is formed over the entire surface, which is then polished and planarized by CMP or the like. Such polishing by CMP is continued until the arm portion 315a(3) of the top pole tip 315a and the coil connection portion 21s are exposed as shown in FIG. 20A. Through the above-described steps, as shown in FIG. 20A and FIG. 20B, the increased width portion 315a(2) of the top pole tip 315a is surrounded by the top connection portion 520a from four directions, i.e. from the top, both sides, and the back, and the two arm portions 315a(3) are surrounded by the top connection portion 520a from three directions, i.e. from both sides and the back. The subsequent steps are the same as those of the first embodiment described above.

Although the top connection portion 520a is not provided on the arm portion 315a(3) of the top pole tip 315a, it extends over the increased width portion 315a(2). Consequently, the resulting thickness of the element structure is relatively small, and a sufficient magnetic volume can be secured in a region immediately proximate to the tip portion 315a(1) in the width and thickness directions. A sufficient magnetic volume can be naturally secured over the insulating film pattern 516a as well in the width and thickness directions. The features of the structure and manufacturing method related to reduction in number of manufacturing steps and the like other than those described above are the same as those of the head shown in FIG. 12.

Figure 21A:
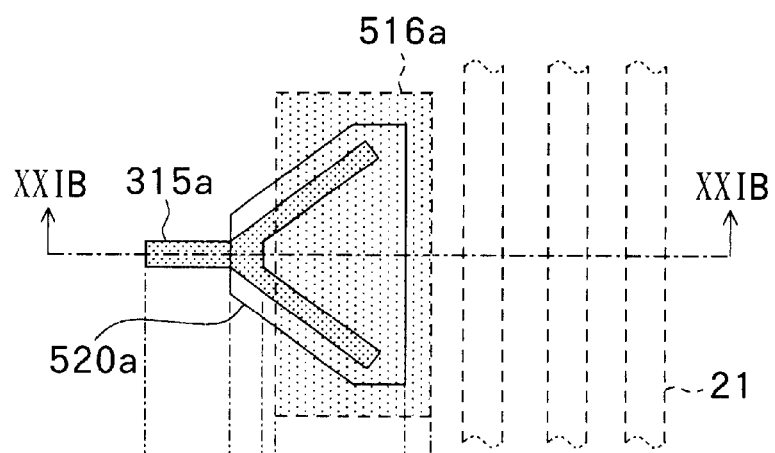
FIG. 21A and FIG. 21B are a plan view and a cross sectional view, respectively, illustrating a step subsequent to the step shown in FIG. 20A and FIG. 20B.
Figure 21B:
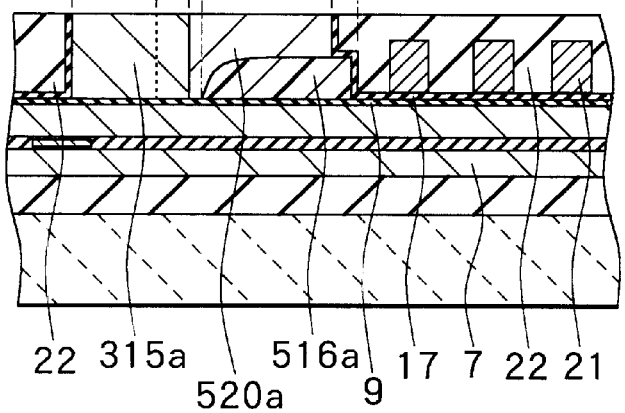

As shown in FIG. 21A and FIG. 21B, for example, the above polishing step by CMP or the like may be continued until the entire surface of the top pole tip 315a is exposed. In such a case, a further reduction in thickness of the entire element can be achieved, and a sufficient magnetic volume can be secured in the region immediately proximate to the tip portion 315a(1) in the width direction.

Second Embodiment

A method of manufacturing a thin film magnetic head according to a second embodiment of the invention will be described with reference to FIG. 22A, FIG. 22B, and FIG. 23. The thin film magnetic head of this embodiment will be described together with the method of manufacturing a thin film magnetic head of this embodiment because it is embodied by this method. The thin film magnetic head of this embodiment includes a two-stage thin film coil (thin film coils 21 and 121), in contrast to the single stage thin film coil (the thin film coil 21) in the above-described first embodiment.

Figures 22A, 22B:
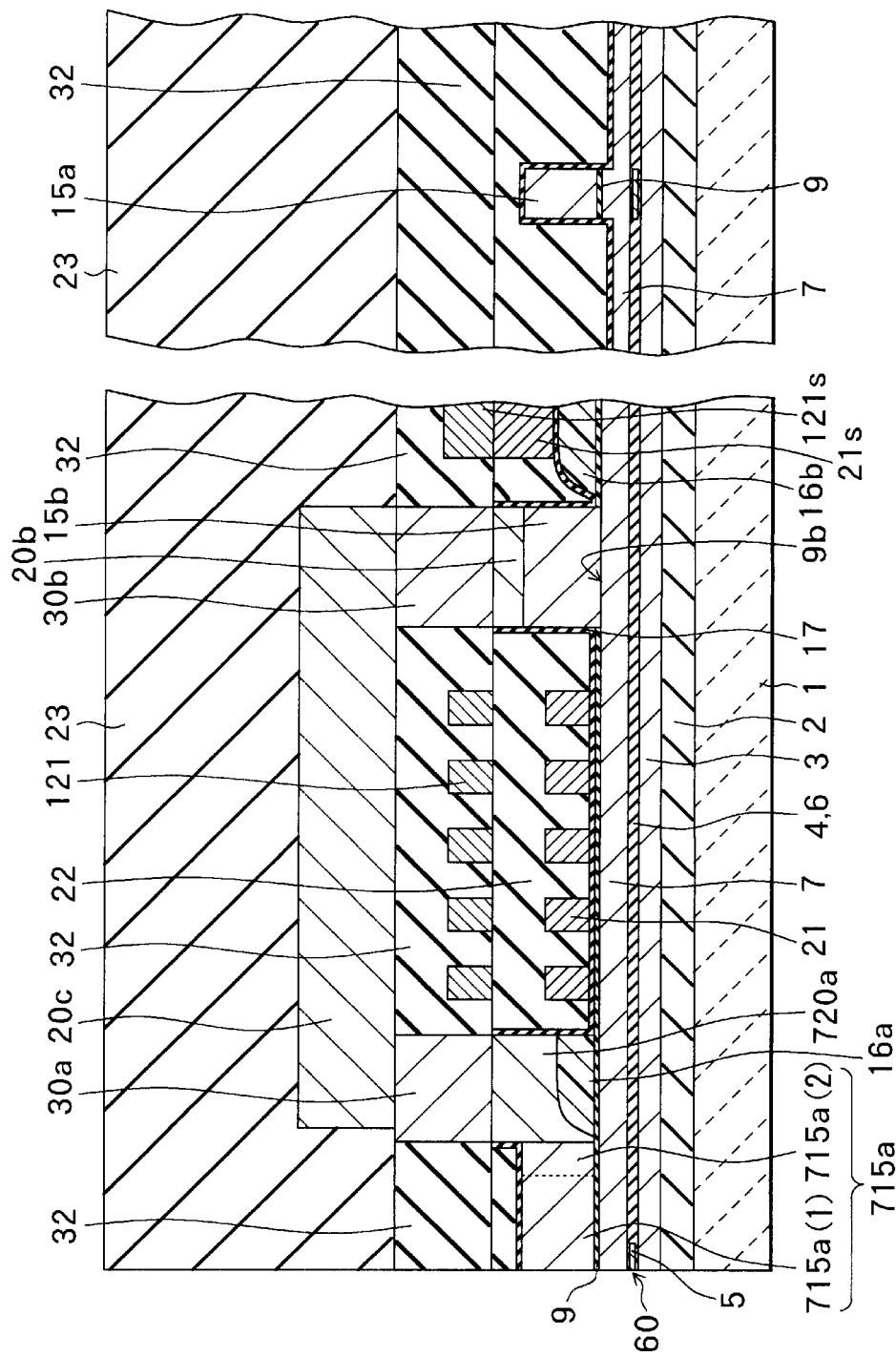
FIG. 22A and FIG. 22B are cross sectional views illustrating a structure of a thin film magnetic head according to a second embodiment of the invention.
Figure 23:
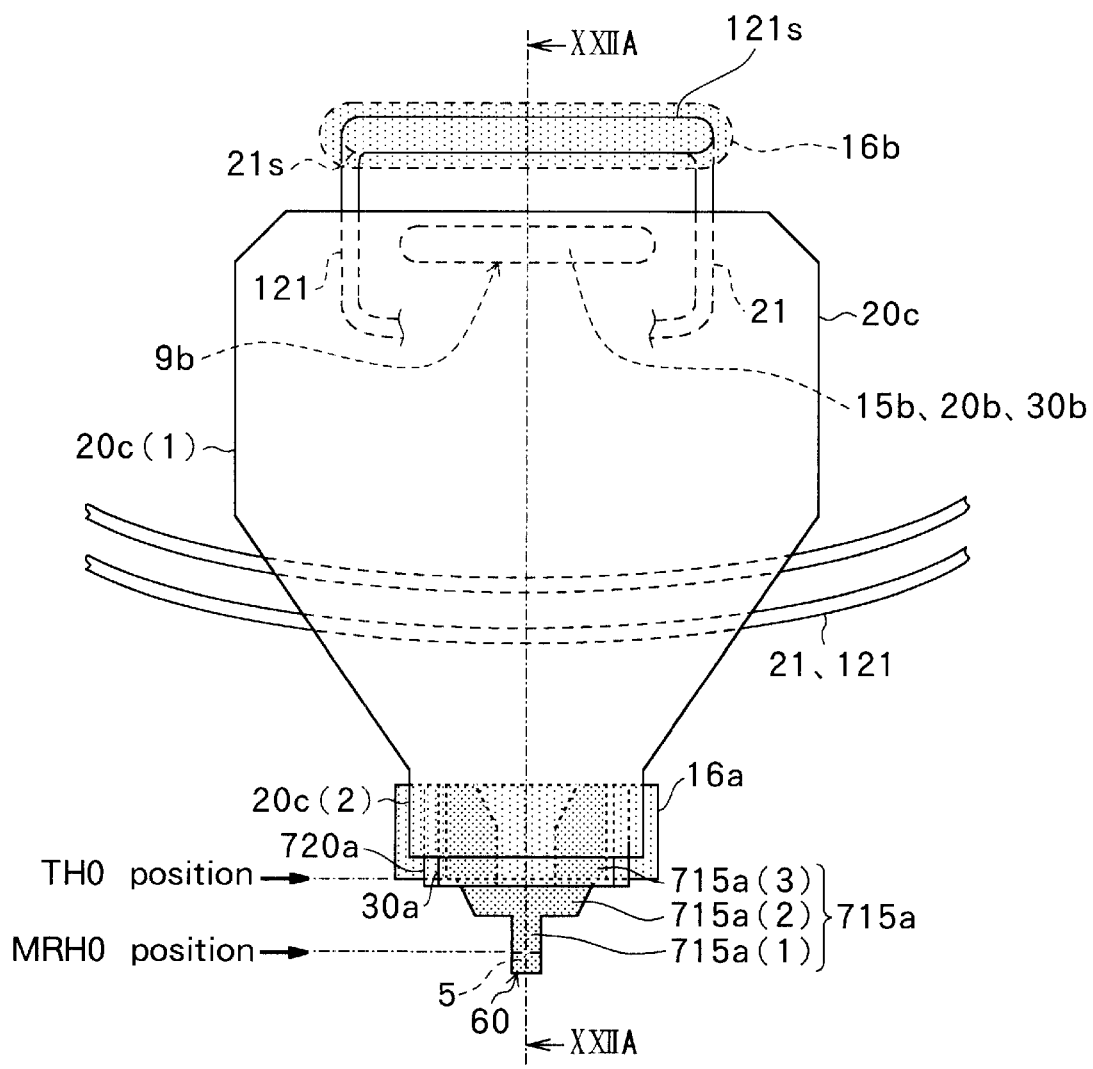
FIG. 23 is a plan view illustrating the structure of the thin film magnetic head according to the second embodiment of the invention.

FIG. 22A, FIG. 22B, and FIG. 23 illustrate a structure of an important part of the thin film magnetic head of this embodiment. FIG. 22A shows a cross section perpendicular to the air bearing surface, and FIG. 22B shows a cross section of a pole portion in parallel to the air bearing surface. FIG. 23 shows a planar structure of the important part of the thin film magnetic head. In these figures, the elements identical to those in the above-described first embodiment and the like are labeled with the identical numerals and characters.

In this embodiment, the top pole tip 15a (FIG. 12) in the above-described first embodiment is replaced with a top pole tip 715a having such a planar shape as shown in FIG. 23, and the top connection portion 20a is replaced with a top connection portion 720a having such a planar shape as shown in FIG. 23. Except for these features, the manufacturing steps up to the step of planarizing the surface of the insulating film 22 by CMP until exposing the top connection portion 720a, the magnetic path connection portion 20b, and the coil connection portion 21s are the same as those of the first embodiment up to the step shown in FIG. 5A and FIG. 5B, and therefore description thereof will not be repeated. The top pole tip 715a and the top connection portion 720a described above correspond to one specific example of a "first magnetic layer portion" of the invention.

In this embodiment, after the surface of the insulating film 22 and the like is planarized, another top connection portion 30a of 2 to 3 µm in thickness having, for example, a rectangular planar shape is selectively formed on the top connection portion 720a, as shown in FIG. 22A and FIG. 22B. At the same time, another magnetic path connection portion 30b is formed on the magnetic path connection portion 20b. The foremost end of the top connection portion 30a is positioned, for example, in line with the rearmost end of the top pole tip 715a. The materials and formation methods of the top connection portion 30a and the magnetic path connection portion 30b are the same as those of the top connection portion 720a and the magnetic path connection portion 720b, respectively.

On the insulating film 22 located between the top connection portion 30a and the magnetic path connection portion 30b, the thin film coil 121 of, for example, copper (Cu) is formed as a second layer of the thin film coil in thickness of about 1.5 to 2.5 µm by, for example, electrolytic plating.

At the same time, a coil connection portion 121s forming an inner end of the thin film coil 121 is formed on the coil connection portion 21s located behind the magnetic path connection portion 30b. The coil connection portion 121s is used for electrically connecting the first layer of thin film coil 21 and the second layer of thin film coil 121. The above-described thin film coil 121 and the coil connection portion 121s correspond to one specific example of a "second thin film coil pattern" as a "conductive pattern" of the invention. Further, the above-described thin film coils 21 and 121, and the coil connection portions 21s and 121s correspond to one specific example of a "thin film coil" of the invention.

After forming an insulating film 32 of, for example, alumina over the entire surface in thickness of, for example, about 3 to 4 μm, the entire surface is polished and planarized by CMP or the like. In this step, polishing the surface by CMP is continued until the top connection portion 30a and the magnetic path connection portion 30b are exposed. The upper surface of the coil connection portion 121s is flush with that of the thin film coil 121, buried in the insulating film 32. The above-described insulating film 32 corresponds to one specific example of a "fourth insulating layer portion" of the invention. The above-described insulating film patterns 16a and 16b, and the insulating films 22 and 32 correspond to one specific example of an "insulating layer" of the invention.

The top yoke 20c having the structural features similar to that of the above-described first embodiment is selectively formed in a region extending from the magnetic path connection portion 30b to the top connection portion 30b. The overcoat layer 23 is then formed of, for example, alumina covering the entire surface. Finally, the air bearing surface 60 is formed through mechanical polishing with a slider or the like, completing the thin film magnetic head of this embodiment.

FIG. 23 is a plan view schematically illustrating a planar structure of the thin film magnetic head manufactured by the manufacturing method of the thin film magnetic head of this embodiment. In FIG. 23, the elements identical to those of the above-described first embodiment shown in FIG. 12 are labeled with the identical numerals and characters. The insulating films 22 and 32, the overcoat layer 23, and the like are not shown in FIG. 23. In addition, the thin film coil 121 is indicated only by part of its turns at the outer periphery and in the vicinity thereof. FIG. 22A shows a cross section taken along the line XXIIA—XXIIA in FIG. 23. In the following, structural features of the thin film magnetic head of this embodiment will be described in comparison with those of the head of the above-described first embodiment shown in FIG. 12 and FIG. 17.

According to the present embodiment, the planar shape of the top pole tip 715a is changed from a T-shape in FIG. 12 or a Y-shape in FIG. 17 into a combination of an I-shape and a U-shape as shown in FIG. 23. The tip portion 715a(1) is formed as an I-shape, and the increased width portion 715a(2) and the arm portion 715a(3) are integrally formed substantially as a U-shape. The arm portion 715a(3) extends over the insulating film pattern 16a. It should be noted, however, that two arm portions 715a(3) extend substantially in parallel to each other, different from those shown in FIG. 17. The two arm portions 715a(3) each have an end located at the rearmost end of the insulating film pattern 16a, and a chamfered corner on the inner rear side, facing each other. The increased width portion 715a(2) has such a planar shape that its width gradually decreases as it approaches the air bearing surface 60. When the top pole tip 715a is formed of, for example, an iron nitride type alloy, it is preferably formed by a plating method, rather than a dry process such as sputtering, because of the reasons similar to those in the Variation 1-3 of the above-described first embodiment.

The top connection portion 720a has a foremost end positioned substantially in line with the rearmost end of the increased width portion 715a(2), and a rearmost end located at the rearmost end of the insulating film pattern 16a. As a result, the top connection portion 720a surrounds only the arm portion 715a(3) of the top pole tip 715a from three directions, i.e. from the top and both sides.

The top connection portion 30a is disposed overlapping the top pole tip 715a and the top pole 20c and connecting these two elements. This top connection portion 30a has, for example, a rectangular planar shape, and foremost and rearmost ends positioned substantially in line with the foremost and rearmost ends of the top connection portion 720a, respectively. While the width of the top connection portion 30a is smaller than that of the top pole 20c in FIG. 23, it may be as wide as, or wider than, the width of the top pole 20c.

The foremost end of the top pole 20c is positioned slightly rearward from the foremost end of the top connection portion 30a. However, the foremost end of the top pole 20c may be positioned in line with, or in front of, the foremost end of the top connection portion 30a. The rearmost end of the top connection portion 30a is substantially in line with the rearmost end of the magnetic path connection portion 30b. The top pole 20c is magnetically coupled to the bottom pole 7 (not shown in FIG. 23) through the magnetic path connection portions 30b, 20b, and 15b, and also to the top pole tip 15a through the top connection portions 30a and 20a. These magnetic layers constitute the magnetic path surrounding the thin film coils 21 and 121. The rest of the structure is the same as those shown in FIG. 12.

The coil connection portion 121s and the coil connection portion 21s disposed on the insulating film 17 covering the insulating film pattern 16b are electrically connected to each other, and the thin film coils 121 and 21 integrally formed with these coil connection portions are also electrically connected to each other. The outer peripheral end of each of the thin film coils 21 and 121 is connected to an unillustrated external circuit, which supplies electricity to these thin film coils 21 and 121.

In the thin film magnetic head having the structure described above, as magnetic flux generated in the thin film coils 21 and 121 propagates from the top yoke 20c through the top connection portions 30a and 20a to the top pole tip 715a, it converges in steps in accordance with a stepwise decrease in magnetic volume at the respective portions forming the propagation path, so that a sufficient amount of magnetic flux reaches the tip portion 715a(1) of the top pole tip 715a in the end. Especially in this embodiment, dual layers of thin film coils 21 and 121 are disposed to increase the amount of generated magnetic flux, and the top connection portion 30a is disposed in the space created between the top connection portion 20a and the top pole 20c by providing such two-layered thin film coils, so that an even greater amount of magnetic volume is secured between the top pole tip 715a and the top yoke 20c. Consequently, excellent overwrite characteristics can be ensured similarly to the above-described first embodiment because of such propagation and conversion functions of magnetic flux.

In the present embodiment as well, the insulating film pattern 16b is formed by the same step as the step of forming the insulating film pattern 16a for defining the throat height zero (TH0) position, and the coil connection portion 21s is formed over the insulating film 16b simultaneously with the formation of the thin film coil 21. As a result, when the surface of the insulating film 22 is polished by CMP until the top connection portion 720a, the magnetic path connection portion 20b, and the coil connection portion 21s are exposed, only the coil connection portion 21s can be exposed without exposing the thin film coil 21 due to the effects similar to those of the above-described first embodiment. Therefore, the coil connection portions 21s and 121s can be electrically connected to each other without forming the opening 22b, which is required in the comparison example described above in connection with FIG. 13A and FIG. 13B. Consequently, the number of manufacturing steps can be reduced similarly to the above-described first embodiment.

Further, in this embodiment, the top pole tip 715a, the top connection portion 30a, and the top pole 20c can all be formed on the planarized portion, whereby a photoresist pattern can be formed with high precision through photolithography, improving manufacturing precision. Especially, the width of the tip portion 715a(1) can be made small with high precision.

Further, because such a material as alumina is used to form the insulating film 32 for burying the thin film coil 121 and the like, problems in processing the insulating film 32 formed of a soft material similar to those associated with polishing the surface of the insulating film 22 can be avoided.

The rearmost end of the top connection portion 30a in this embodiment may not be positioned in line with the rearmost end of the top pole tip 715a, and it may be, for example, in front of, or behind, the rearmost end of the top pole tip 715a.

The other functions, effects, and variations of the thin film magnetic head and the manufacturing method thereof in this embodiment are the same as those of the first embodiment, and therefore description thereof will not be repeated.

While the invention has been described in the context of its preferred embodiments, it is not limited to such embodiments, and numerous variations are possible. For example, although such materials as permalloy (NiFe), iron nitride (FeN), and the like are used for the top pole tip 15a, the magnetic path connection portion 15b, the top connection portion 20a, the magnetic path connection portion 20b, and the top yoke 20c in the above embodiments, other materials including high saturation magnetic flux density materials, such as an amorphous Fe—Co—Zr alloy, can be used, or layers of more than one of these materials can be stacked. Further, a magnetic material composed of stacked layers of NiFe and the above high saturation magnetic flux density material can be used for the bottom pole 7.

While the coil connection portions 21s and 121s are disposed at respective inner peripheral ends of the thin film coils 21 and 121 in this embodiment as shown in FIG. 7, the invention is not limited to the above examples, and the coil connection portions 21s and 121s may be disposed, for example, at respective outer peripheral ends of the thin film coils 21 and 121. However, in such a case, the insulating film pattern 16b must be disposed at a position corresponding to the outer peripheral ends of the thin film coils 21 and 121.

Further, for example, while the layers (insulating film 17) underlying the thin film coil 21 and the coil connection portion 21s are described as being flush with each other in the above embodiments and variations thereof, the invention is not limited to this example, and can be applied to the structure where there is some difference in height between the layers underlying these two elements. In such a case as well, after the insulating film 22 is formed, only the coil connection portion 21s can be exposed without exposing the thin film coil 21 by polishing the surface of the insulating film 22 until the top connection portion 20a, the magnetic path connection portion 20b, and the coil connection portion 21s are exposed if the difference is small, and the present invention thereby provides advantages.

Further, for example, while a method of manufacturing a composite thin film magnetic head is described in the above embodiments and variations thereof, the present invention can also be applied to a thin film magnetic head dedicated to recording and having a writing inductive magnetic transducer, and to a thin film magnetic head having an inductive magnetic transducer for both recording and reproducing. In addition, the present invention can also be applied to a thin film magnetic head having a structure where the layers of the reading and writing elements are stacked in the order opposite to that described above.

According to the method of manufacturing a thin film magnetic head of the invention, the second insulating layer portion is formed in a region farther from the recording medium facing surface than a region where the first insulating layer portion is disposed at the same time the first insulating layer portion is formed, and the connection pattern integral with the first thin film coil pattern is formed on the second insulating layer portion. As a result, in contrast to the case where the connection pattern is formed without forming the second insulating layer portion, the step of forming an opening by removing part of the third insulating layer portion for the sake of electrically connecting the connection pattern and the conductive layer pattern can be eliminated. Thus, the number of manufacturing steps can be reduced. Further, since only the connection pattern is exposed after polishing the surface and the first thin film coil pattern remains covered with the third insulating layer portion, insulation between the first thin film coil pattern and the second magnetic layer portion can be ensured.

According to the thin film magnetic head of the invention, the connection pattern integral with the first thin film coil pattern is disposed on the second insulating layer portion and part of the conductive layer pattern is disposed on the connection pattern, whereby the thin film magnetic head can be formed by applying the above method of manufacturing a thin film magnetic head of the invention.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head including two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers, one of the two magnetic layers including a first magnetic layer portion which extends from a recording-medium-facing surface facing the recording medium in a direction away from the recording-medium-facing surface and has a constant width portion defining a track width, and a second magnetic layer portion covering an area where the thin film coil is disposed and partially overlapping, and magnetically coupled to, the first magnetic layer portion, the method including:

a first step of forming a first insulating layer portion constituting part of the insulating layer and defining an edge of the insulating layer closest to the recording-medium-facing surface, and simultaneously forming a second insulating layer portion constituting part of the insulating layer in a region located farther from the recording-medium-facing surface than a region where the first insulating layer portion is disposed;

a second step of forming the first magnetic layer portion;

a third step of forming a first thin film coil pattern constituting part of the thin film coil, and simultaneously forming a connection pattern integrally with the first thin film coil pattern over the second insulating layer portion;

a fourth step of forming a third insulating layer portion constituting part of the insulating layer so as to cover at least the first magnetic layer portion, the first thin film coil pattern, the second insulating layer portion, and the connection pattern;

a fifth step of polishing and planarizing a surface of the third insulating layer portion until at least both of the first magnetic layer portion and the connection pattern are exposed; and a sixth step of forming a conductive layer pattern to be electrically connected to the exposed position of the connection pattern.

2. A method of manufacturing the thin film magnetic head according to claim 1, wherein the conductive layer pattern is formed of a same material simultaneously with the second magnetic layer portion.

3. A method of manufacturing the thin film magnetic head according to claim 1, wherein the conductive layer pattern is formed as a wiring pattern for supplying electricity to the first thin film coil pattern.

4. A method of manufacturing the thin film magnetic head according to claim 1, wherein, when the thin film coil further includes a second thin film coil pattern, the conductive layer pattern is formed as the second thin film coil pattern.

5. A method of manufacturing the thin film magnetic head according to claim 4, further including a seventh step of forming a fourth insulating layer portion constituting part of the insulating layer to bury the conductive layer pattern.

* * * * *